US008837880B2

(12) United States Patent
Takeda et al.

(10) Patent No.: US 8,837,880 B2
(45) Date of Patent: Sep. 16, 2014

(54) VIRTUAL IMAGE DISPLAY DEVICE

(75) Inventors: Takashi Takeda, Suwa (JP); Masayuki Takagi, Shiojiri (JP); Toshiaki Miyao, Matsumoto (JP); Takahiro Totani, Suwa (JP); Akira Komatsu, Kamiina-gun (JP)

(73) Assignee: Seiko Epson Corporation, Tokyo (JP)

( * ) Notice: Subject to any disclaimer, the term of this patent is extended or adjusted under 35 U.S.C. 154(b) by 474 days.

(21) Appl. No.: 13/251,614

(22) Filed: Oct. 3, 2011

(65) Prior Publication Data

US 2012/0086625 A1  Apr. 12, 2012

(30) Foreign Application Priority Data

Oct. 8, 2010  (JP) ................................. 2010-228179
Aug. 5, 2011  (JP) ................................. 2011-171618

(51) Int. Cl.
| G02B 6/32  | (2006.01) |
| G02B 6/24  | (2006.01) |
| G02B 27/22 | (2006.01) |
| F21V 8/00  | (2006.01) |
| G02B 27/01 | (2006.01) |
| G02B 6/00  | (2006.01) |

(52) U.S. Cl.
CPC ...... *G02B 27/0172* (2013.01); *G02B 2027/011* (2013.01); *G02B 6/00* (2013.01); *G02B 27/2214* (2013.01); *G01B 6/0008* (2013.01); *G02B 6/0006* (2013.01); *G02B 2027/0121* (2013.01)
USPC ............................................. 385/33; 385/15

(58) Field of Classification Search
None
See application file for complete search history.

(56) References Cited

U.S. PATENT DOCUMENTS

| 5,757,544 A * | 5/1998 | Tabata et al. .................. 359/434 |
| 2003/0086135 A1* | 5/2003 | Takeyama ....................... 359/13 |
| 2003/0165017 A1 | 9/2003 | Amitai |
| 2004/0085649 A1 | 5/2004 | Repetto et al. |
| 2007/0058261 A1 | 3/2007 | Sugihara et al. |
| 2010/0245211 A1 | 9/2010 | Iba et al. |
| 2011/0050753 A1* | 3/2011 | Li et al. ......................... 345/690 |
| 2011/0102412 A1* | 5/2011 | Yamamoto et al. ........... 345/212 |
| 2011/0234476 A1 | 9/2011 | Sugihara et al. |

FOREIGN PATENT DOCUMENTS

| CN | 102200641 A | 9/2011 |
| JP | A-2003-337298 | 11/2003 |
| JP | A-2003-536100 | 12/2003 |
| JP | A-2003-536102 | 12/2003 |
| JP | A-2004-157520 | 6/2004 |
| JP | A-2006-3879 | 1/2006 |
| JP | A-2010-224473 | 10/2010 |
| WO | WO 01/95005 A1 | 12/2001 |

* cited by examiner

*Primary Examiner* — Michelle R Connelly
(74) *Attorney, Agent, or Firm* — Oliff PLC

(57) ABSTRACT

The invention is directed to provide a virtual image display device capable of setting the aspect ratio of the image light entering the eyes of the observer as a virtual image to a desired state while fulfilling the design limitations. In the invention, the aspect ratio of the virtual image can be converted to the aspect ratio (16:9) laterally longer than the aspect ratio (4:3) of the image area due to the conversion in the aspect ratio conversion optical system. Thus, the aspect ratio of the image light to be recognized by the eye of the observer as a virtual image can be adjusted to a desired state even in the case in which, for example, the lateral width of the image forming device with respect to the whole of the virtual image display device is limited by a design requirement.

17 Claims, 24 Drawing Sheets

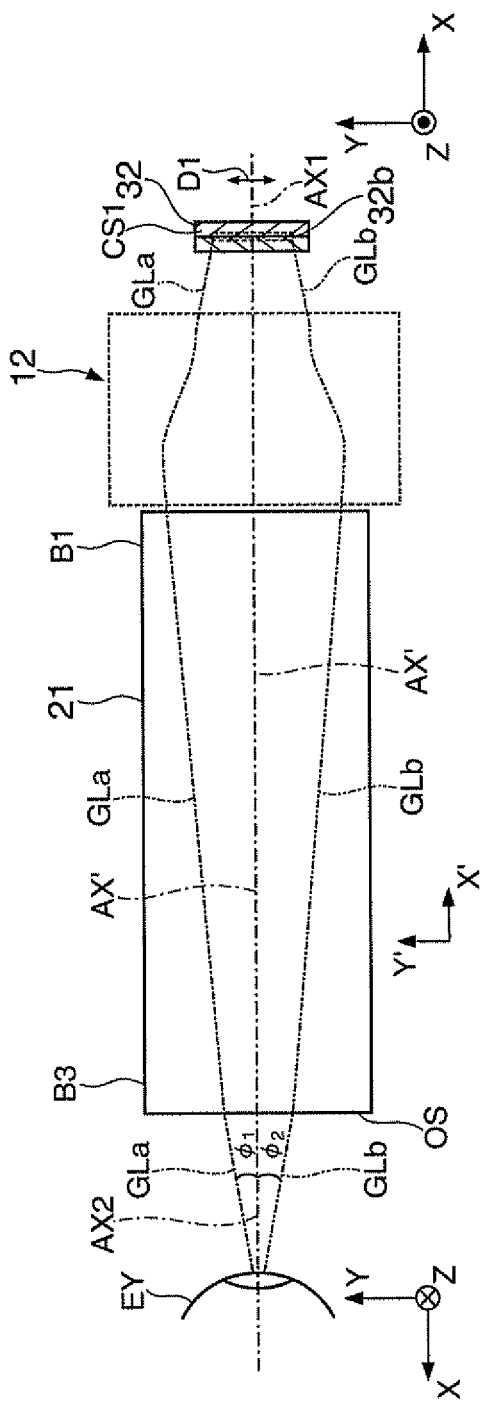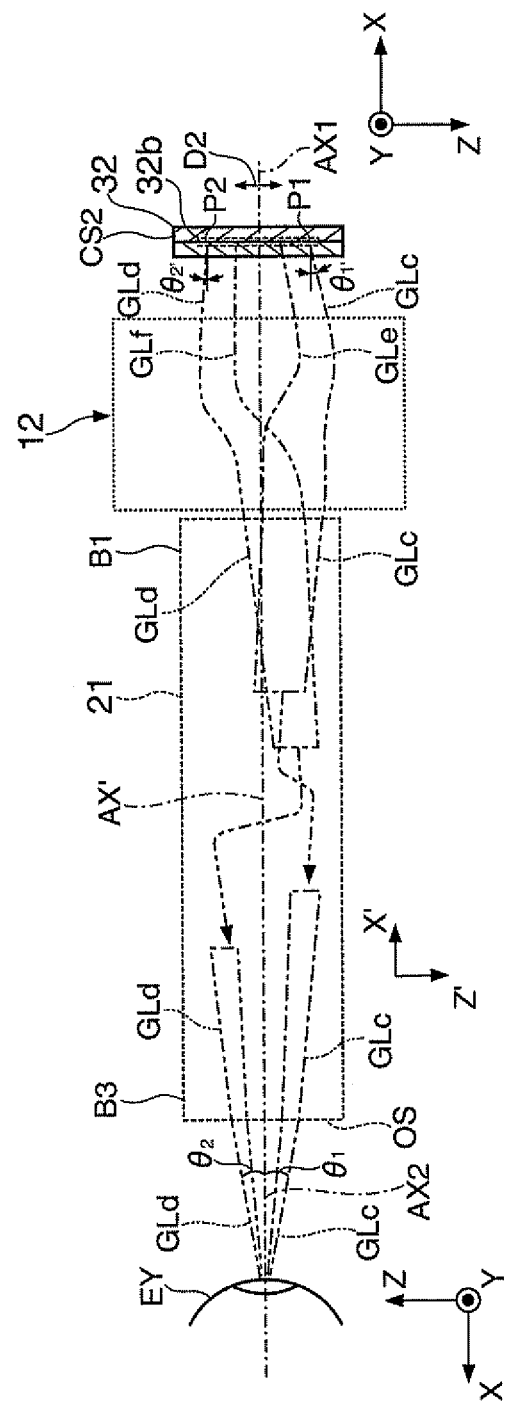
FIG. 3A
FIG. 3B

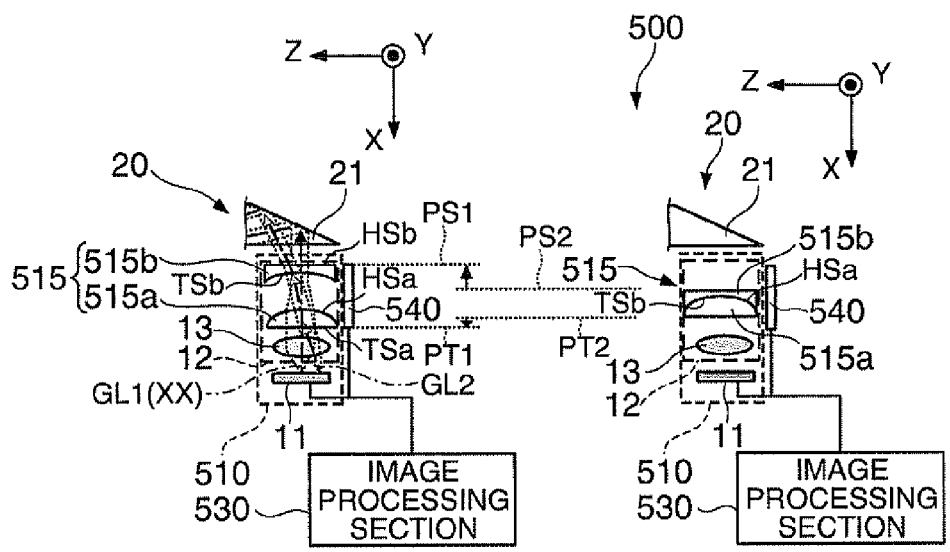
FIG. 13A
FIG. 13B
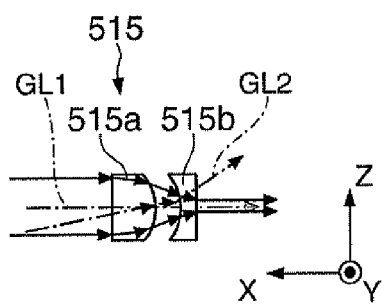
FIG. 13C
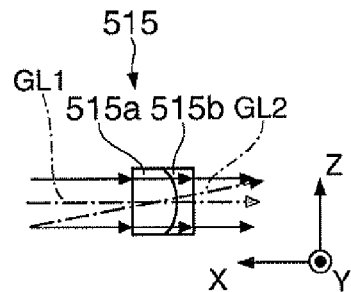
FIG. 13E
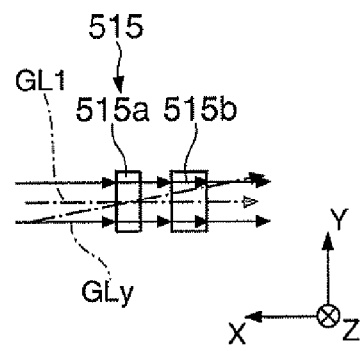
FIG. 13D
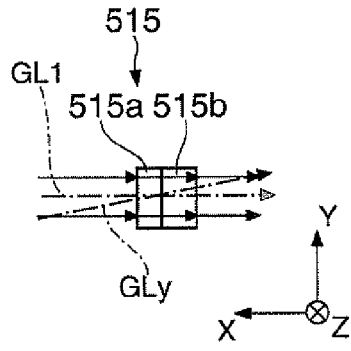
FIG. 13F

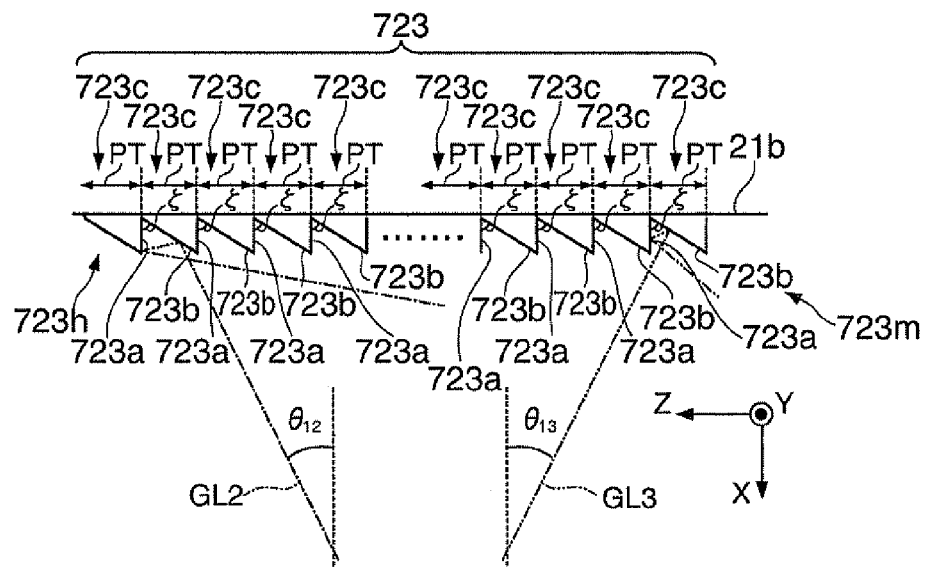
FIG. 18A
FIG. 18B
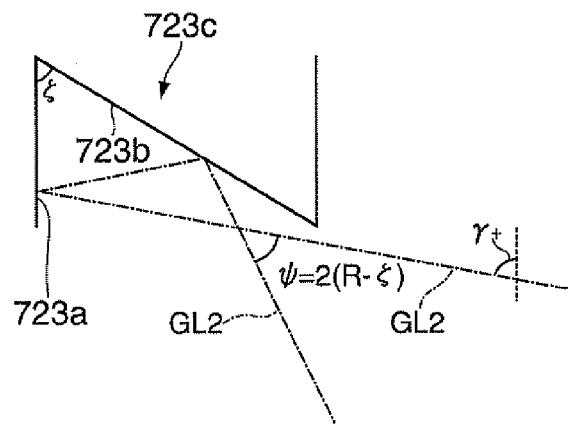
FIG. 18C
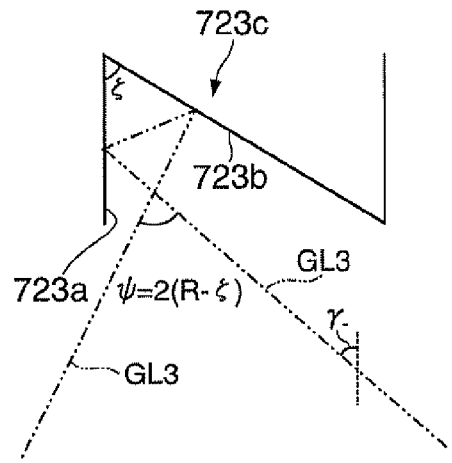

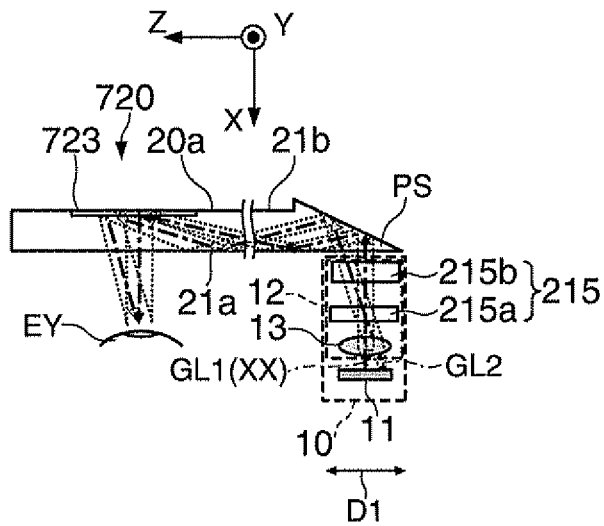 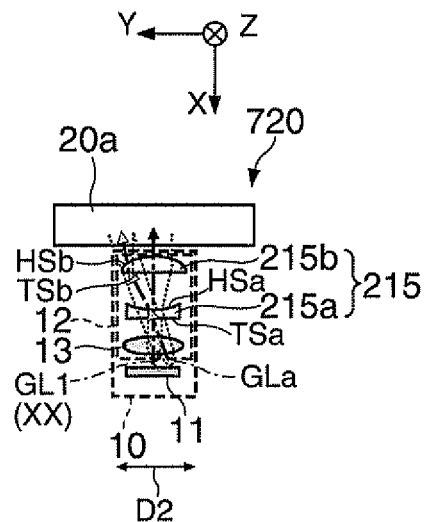
FIG. 20A    FIG. 20B
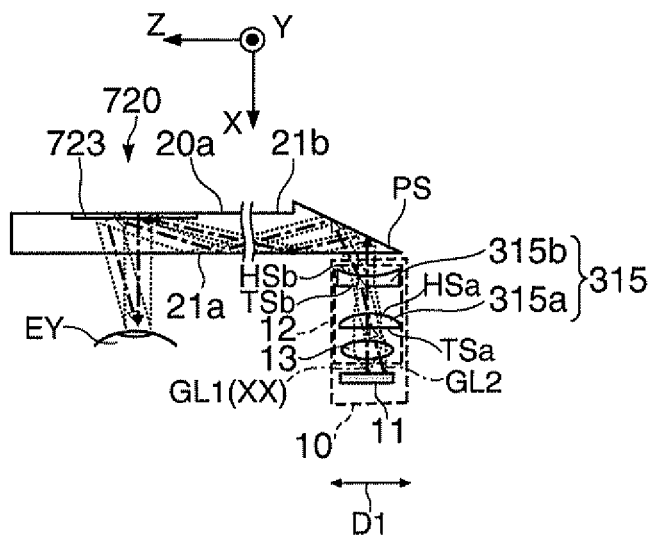 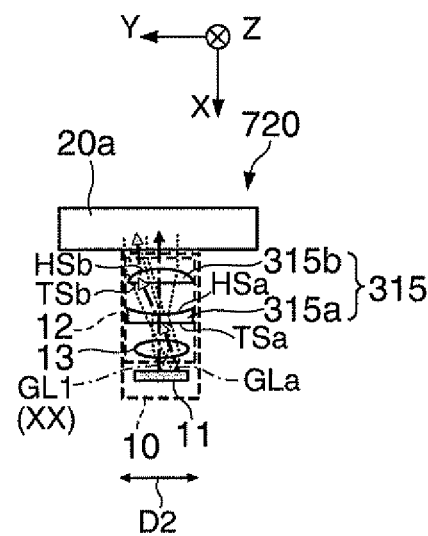
FIG. 20C    FIG. 20D

VIRTUAL IMAGE DISPLAY DEVICE

BACKGROUND

1. Technical Field

The present invention relates to a virtual image display device such as a head-mounted display used while worn on the head.

2. Related Art

In recent years, as a virtual image display device such as a head-mounted display for making formation and observation of a virtual image possible, there have been proposed various devices of a type of guiding the image light from a display element to the pupils of the observer using a light guide plate.

In such a virtual display device, in order for overlapping the image light and the external light, there has been proposed a see-through optical system (see JP-A-2006-3879 (Document 1) and JP-A-2010-224473 (Document 2)).

However, as described above, in the case in which the virtual image display device is a device used while worn on the head such as spectacles, there arise various design limitations regarding the arrangement and the sizes of the constituents of the device from the viewpoint of structure and design. Incidentally, regarding the aspect ratio of the picture to be displayed, those elongated in the direction in which the eyes of the observer are disposed, namely the lateral direction, such as "16:9" increase in recent years. However, due to the design limitations described above, it is not necessarily easy to respond to such a request as to display images of a variety of aspect ratios represented by the horizontally elongated picture of this kind.

SUMMARY

An advantage of some aspects of the invention is to provide a virtual image display device capable of setting the aspect ratio of the image light entering the eyes of the observer as a virtual image to a desired state while fulfilling the design limitations.

An aspect of the invention is directed to a virtual image display device including (a) an image display device adapted to form an image light, (b) a projection optical system adapted to form a virtual image by the image light emitted from the image display device, and (c) a light guide device including a light entrance section adapted to take in the image light having passed through the projection optical system, a light guide section adapted to guide the image light taken in from the light entrance section using total reflection on first and second total reflection surfaces extending so as to be opposed to each other, and a light exit section adapted to take out the image light having passed through the light guide section, wherein (d) the projection optical system includes a toric optical system adapted to perform adjustment of an aspect ratio with respect to a virtual image in an image area of the image display device.

According to the virtual image display device described above, the conversion of the aspect ratio of the virtual image to be observed by the observer can be performed by the toric optical system taking the image area of the image display element as a reference. Thus, even in the case in which the aspect ratio of the image area of the image display element and the aspect ratio required to the picture do not coincide with each other due to the design limitation such as the arrangement or the sizes, the aspect ratio is converted by the toric optical system to thereby enable the observer to recognize the virtual image with a desired aspect ratio.

In a specific aspect of the invention, the virtual image display device of the above aspect of the invention may be configured such that the toric optical system performs conversion of an aspect ratio with respect to the virtual image so as to increase a lateral ratio for the observer taking an aspect ratio of display in the image display device as a reference. In this case, by making the ratio in the lateral direction for the observer larger, the picture to be recognized by the observer can be made longer with respect to the direction along which the eyes of the observer are arranged, namely the lateral direction.

In another aspect of the invention, the virtual image display device of the above aspect of the invention may be configured such that the toric optical system performs either one of an expansion conversion with respect to a first direction corresponding to the lateral direction for the observer, and a contraction conversion with respect to a second direction perpendicular to the first direction. In this case, the picture to be recognized by the observer can be made to have a relatively laterally long desired aspect ratio by the expansion conversion with respect to the first direction or the contraction conversion with respect to the second direction, or both of the conversions.

In another aspect of the invention, the virtual image display device of the above aspect of the invention may be configured such that (a) the image display device is disposed on an ear side of an observer observing the image light, and (b) the light guide device guides the image light along a lateral direction for the observer. In this case, the virtual image display device can be made as relatively small as, for example, spectacles.

In another aspect of the invention, the virtual image display device of the above aspect of the invention may be configured such that, in the image display device, an aspect ratio of a shape of each of a plurality of pixels disposed in the image area is inverse to a ratio of the conversion by the toric optical system. In this case, it is possible to make the image to be recognized by the observer in a state of keeping the aspect ratio of the original picture to a natural shape without modification even if no particular image processing is performed.

In another aspect of the invention, the virtual image display device of the above aspect of the invention may be configured such that, in the image display device, each the pixels is composed of three pixel segments arranged in a line. In this case, a color image can be formed.

In another aspect of the invention, the virtual image display device of the above aspect of the invention may be configured such that the three pixel segments respectively have three colors of RGB, and are arranged in a line along the lateral direction for the observer. In this case, by constituting the three segments with the three colors of RGB, formation of a color image becomes possible, and by arranging the three segments in a line along the lateral direction, the light can more efficiently be used in the case of adopting the active matrix liquid crystal as the image display device.

In another aspect of the invention, the virtual image display device of the above aspect of the invention may be configured such that, in the image display device, each the pixels is composed of four pixel segments arranged in a 2×2 matrix. In this case, it is possible to increase the light intensity or to improve the color reproducibility depending on the coloration of the four segments.

In another aspect of the invention, the virtual image display device of the above aspect of the invention may be configured such that the four pixel segments are assigned with three colors of RGB. In this case, by increasing the number of segments of a certain color out of the three colors, it is possible to achieve a balance of the light intensity between the colors or to assure the light intensity necessary as the whole of the pixels.

In another aspect of the invention, the virtual image display device of the above aspect of the invention may be configured such that the four pixel segments are assigned with four colors obtained by adding another color to the three colors of RGB. In this case, by adding another color, it becomes possible to increase the light intensity or to further enhance the color reproducibility.

In another aspect of the invention, the virtual image display device of the above aspect of the invention may be configured to further include an image processing section adapted to perform a conversion process of an aspect ratio, which is inverse to a conversion ratio of an aspect ratio of the image light by the toric optical system, with respect to an image signal input to the image display device in accordance with the conversion ratio of the aspect ratio of the image light by the toric optical system. In this case, by the image processing for compensating the conversion of the aspect ratio by the toric optical system, it is possible to make the picture to be recognized by the observer to be in the state of the original picture corresponding to the picture signal when the picture signal is externally input.

In another aspect of the invention, the virtual image display device of the above aspect of the invention may be configured to further include a drive mechanism adapted to move the toric optical system on a light path of the image light. In this case, it is possible to perform the switching between ON and OFF of the conversion of the aspect ratio by the toric optical system using the drive mechanism.

In another aspect of the invention, the virtual image display device of the above aspect of the invention may be configured such that the toric optical system includes a pair of cylindrical lenses respectively having concave and convex shapes and disposed in a direction opposed to a light entrance surface of the light guide device adapted to take in the image light, and a conversion ratio of an aspect ratio of the image light is adjusted by changing locations of the cylindrical lenses. In this case, by changing the locations of the pair of concave and convex cylindrical lenses, the conversion ratio of the aspect ratio of the image light can arbitrarily be set.

In another aspect of the invention, the virtual image display device of the above aspect of the invention may be configured such that (a) the light guide section includes a first reflecting surface and a second reflecting surface disposed in parallel to each other, and adapted to make light guide by total reflection possible, (b) the light entrance section includes a third reflecting surface forming a predetermined angle with the first reflecting surface, and (c) the light exit section includes a fourth reflecting surface forming a predetermined angle with the first reflecting surface. In this case, the image light reflected by the third reflecting surface of the light entrance section is propagated while being totally reflected by the first and second reflecting surfaces of the light guide section, and is then reflected by the fourth reflecting surface of the light exit section. Therefore, it is possible to form a virtual image to be input to the eye of the observer.

In another aspect of the invention, the virtual image display device of the above aspect of the invention may be configured such that the light guide device has a hologram element in at least one of the third reflecting surface and the fourth reflecting surface. In this case, the light path of the image light can be adjusted using the hologram element, and further, the light can be taken in with high efficiency.

In another aspect of the invention, the virtual image display device of the above aspect of the invention may be configured such that the light guide device further includes an angle conversion section having a plurality of reflecting surfaces extending in a predetermined direction, and bending the image light guided by total reflection on the first and second total reflection surfaces of the light guide section toward the light exit section using the plurality of reflecting surfaces. In this case, by the angle conversion section bending the image light toward the light exit section and then emitting the image light, it is possible to make the image to be recognized by the observer.

BRIEF DESCRIPTION OF THE DRAWINGS

The invention will be described with reference to the accompanying drawings, wherein like numbers reference like elements.

FIG. 3A is a conceptual diagram of developing a light path with respect to a vertical first direction, and FIG. 3B is a conceptual diagram of developing a light path with respect to a lateral second direction.

FIG. 13A is a diagram for explaining a virtual image display device according to a fifth embodiment of the invention, FIG. 13B is a diagram for explaining the operation of the virtual image display device, FIG. 13C is a diagram for explaining a light path with respect to a lateral direction in a condition in which a lens is in a separate state, FIG. 13D is a diagram for explaining the light path with respect to a vertical direction, FIG. 13E is a diagram for explaining the light path with respect to the lateral direction in a condition in which the lens is in an adhering state, and FIG. 13F is a diagram for explaining the light path with respect to the vertical direction.

FIG. 18A is a schematic diagram for explaining a structure of an angle conversion section and a light path of image light in the angle conversion section, FIG. 18B is a diagram showing a condition of reflection on a back side of the angle conversion section, and FIG. 18C is a diagram showing a condition of reflection on an entrance side of the angle conversion section.

FIGS. 20A and 20B are diagrams showing a modified example of the virtual image display device, and FIGS. 20C and 20D are diagrams showing another modified example of the virtual image display device.

DESCRIPTION OF EXEMPLARY EMBODIMENTS

Hereinafter, some embodiments of the invention will be explained in detail with reference to the accompanying drawings.

A. Exterior Appearance of Virtual Image Display Device

Figure 1:
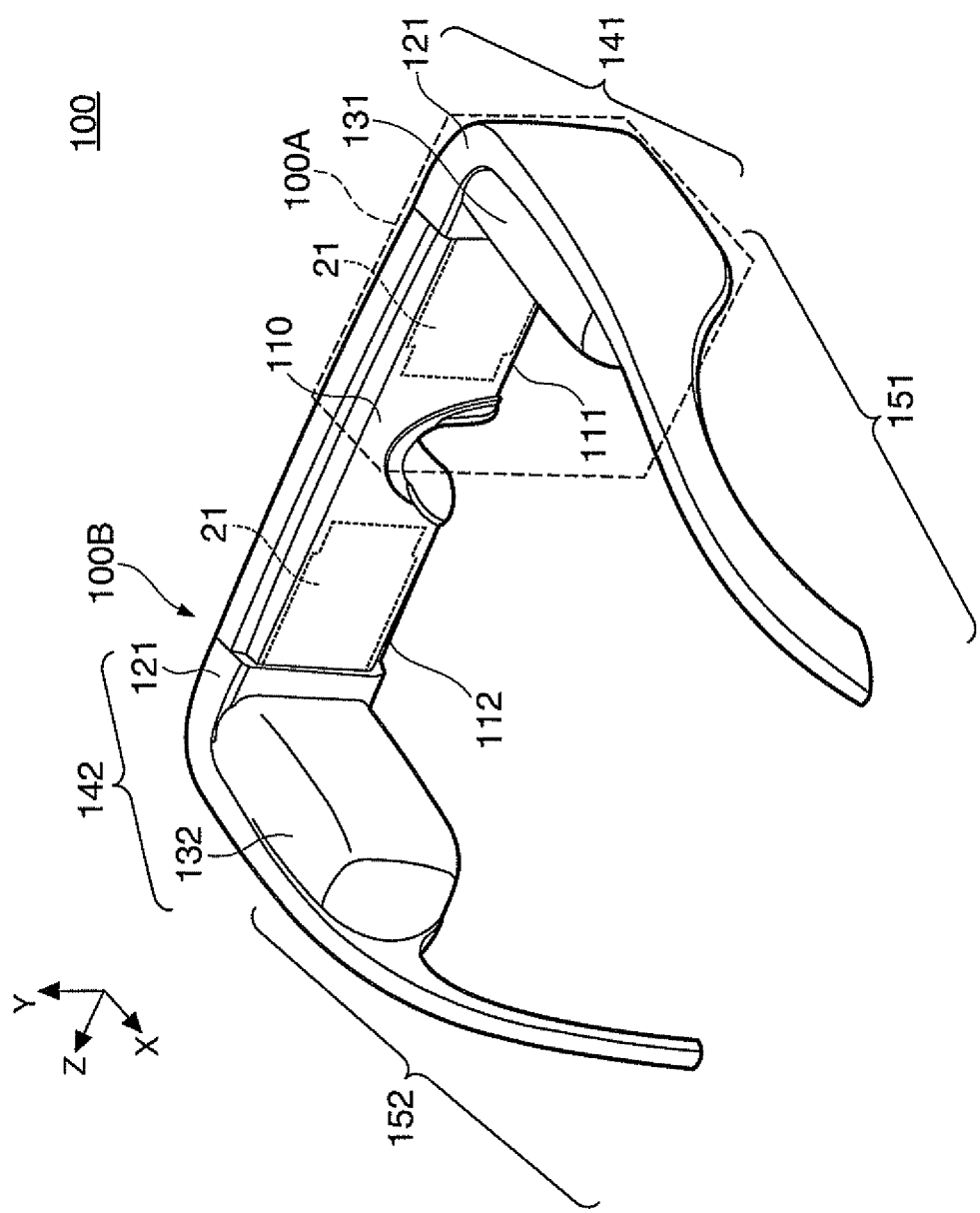
FIG. 1 is a perspective view showing a virtual image display device according to an embodiment of the invention.

A virtual image display device 100 according to the present embodiment shown in FIG. 1 is a head-mounted display having an exterior appearance like spectacles, and is capable of making the observer wearing the virtual image display device 100 recognize image light of a virtual image, and at the same time making the observer observe the external image in a see-through manner. The virtual image display device 100 is provided with an optical panel 110 covering the front of the eyes of the observer, a frame 121 for supporting the optical panel 110, and first and second drive sections 131, 132 attached respectively to parts (front covers) 141, 142 occupying portions of frame 121 extending respectively from both sides of a part located in front of the eyes to the positions just anterior to hinges (not shown) for folding the frame 121 and parts (temples) 151, 152 occupying portions thereof from positions posterior to the hinges to parts to be hung on the ears. Here, the optical panel 110 has a first panel section 111 and a second panel section 112, and the both panel sections 111, 112 form a plate-like part integrally coupled on each other at the center thereof. A first display device 100A obtained by combining the first panel section 111 and the first drive section 131 located on the right in the drawing is a part located in a range surrounded by the broken line in the drawing, namely in a right half range of the whole of the virtual image display device 100 with respect to the center thereof, and for forming a virtual image for the right eye, and functions alone as a virtual image display device. Further a second display device 100B obtained by combining the second panel section 112 and the second drive section 132 located on the left in the drawing is a part located in a left half range of the whole of the virtual image display device 100 with respect to the center thereof, and for forming a virtual image for the left eye, and functions alone as a virtual image display device. In this case, it results that an image forming device 10 is disposed adjacent to the ear of the observer.

B. Structure of Display Devices

Figure 2B:
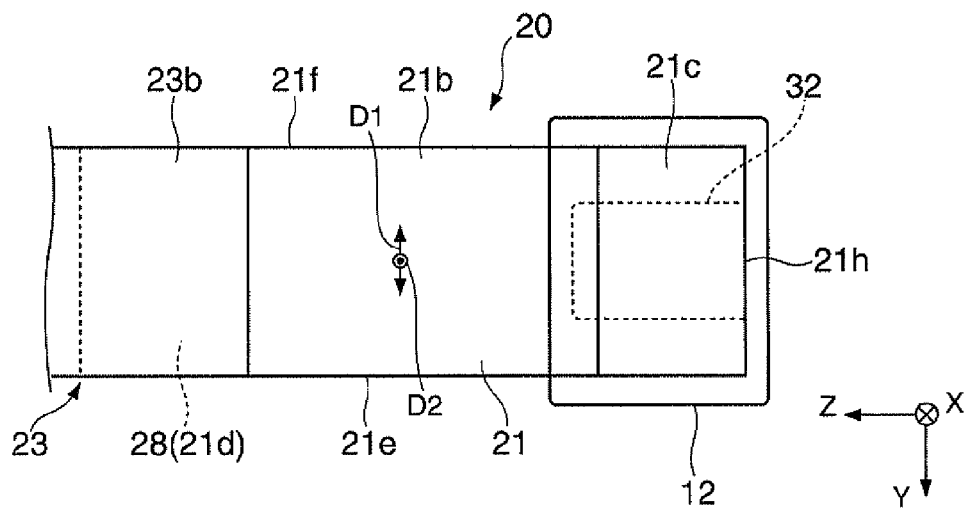
FIG. 2B is a front view of the main part.
Figure 2A:
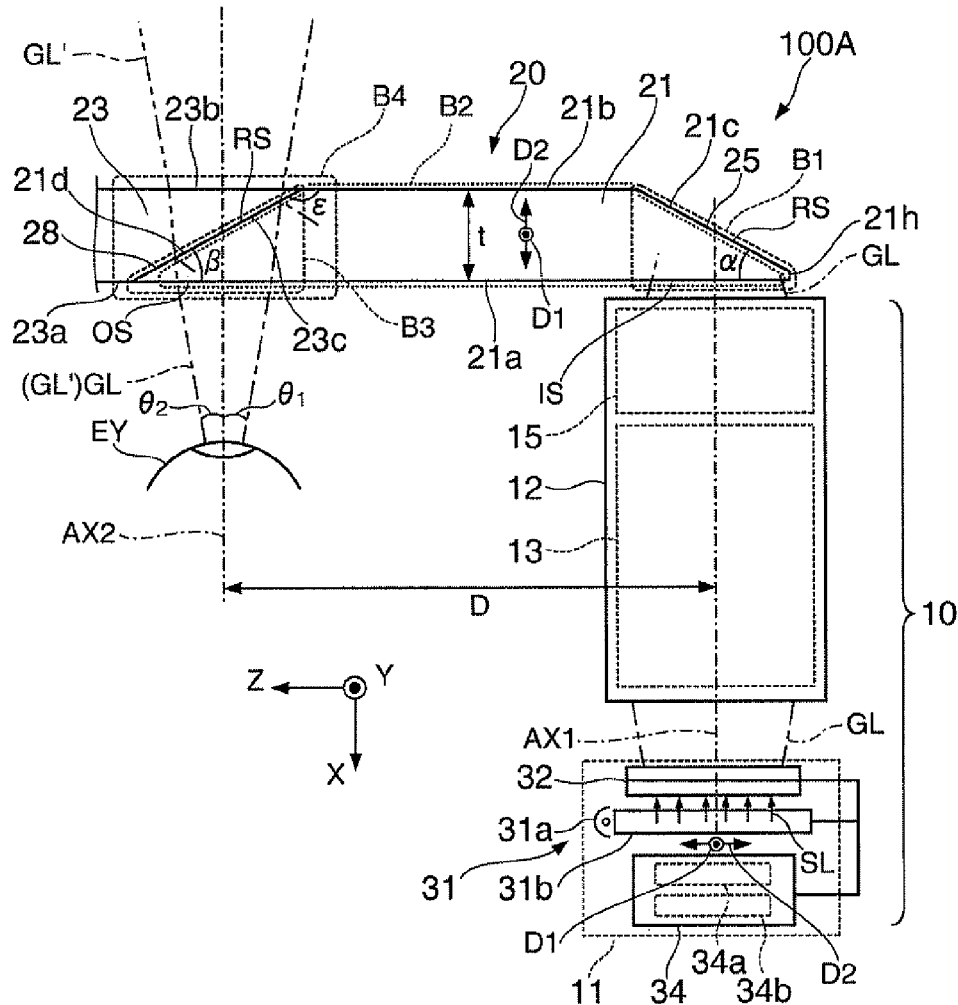
FIG. 2A is a plan view of a main part of a first display device constituting the virtual image display device.

As shown in FIG. 2A, the first display device 100A is provided with the image forming device 10 and a light guide device 20. Here, the image forming device 10 corresponds to the first drive section 131 in the range surrounded by the broken line shown in FIG. 1, and the light guide device 20 corresponds to the first panel section 111 shown in FIG. 1. It should be noted that the second display device 100B shown in FIG. 1 has a structure similar to the structure of the first display device 100A, which is obtained by simply flipping the structure of the first display device 100A in a lateral direction, and therefore, the detailed explanation of the second display device 100B will be omitted.

The image forming device 10 has an image display device 11 and a projection optical system 12. Among these constituents, the image display device 11 has an illumination device 31 for emitting two-dimensional illumination light SL, a liquid crystal display device 32 as a transmissive spatial light modulation device, and a drive control section 34 for controlling the operations of the illumination device 31 and the liquid crystal display device 32.

The illumination device 31 has a light source 31a for generating light including light components of three colors of red, green, and blue, and a backlight light guide section 31b for diffusing the light from the light source 31a to form a light beam having two-dimensional spread with a rectangular cross-section. The liquid crystal display device 32 spatially modulates the illumination light SL from the illumination device 31 to thereby form the image light to be the display object such as a moving image. The drive control section 34 is provided with a light source drive circuit 34a and a liquid crystal drive circuit 34b. The light source drive circuit 34a supplies the light source 31a of the illumination device 31 with electricity to thereby make it emit the illumination light SL with stable luminance. The liquid crystal drive circuit 34b outputs an image signal or a drive signal to the liquid crystal display device 32 to thereby form the color image light to be an origin if a moving image or a still image in the form of a transmittance pattern. It should be noted that it is possible to provide an image processing function to the liquid crystal drive circuit 34b, and it is also possible to provide the image processing function to an external control circuit.

In the liquid crystal device 32, a first direction D1 corresponds to a direction in which a vertical cross-sectional surface including a first light axis AX1 passing through the projection optical system 12 and a specific line parallel to a third reflecting surface 21c of the light guide member 21 described later extends, and a second direction D2 corresponds to a direction in which a horizontal cross-sectional surface including the first light axis AX1 described above and a normal line of the third reflecting surface 21c described above extends. In other words, in the position of the liquid crystal display device 32, the first direction D1 corresponds to the vertical Y direction and the second direction D2 corresponds to the horizontal Z direction.

The projection optical system 12 is a lens group including a collimating lens 13 for converting the image light emitted from each point on the liquid crystal device 32 into a light beam in a parallel state, and an aspect ratio conversion optical system 15, which is a toric optical system for adjusting the spread condition of the image light having been made to be the parallel light beam by the collimating lens 13 to thereby perform an adjustment of the aspect ratio with respect to the virtual image to be displayed.

The light guide device 20 is obtained by bonding the light guide member 21 and a light transmissive member 23 to each other, and forming an optical member having a tabular shape extending in parallel to the Y-Z plane as a whole.

The light guide member 21 out of the light guide device 20 is a prism-like member having a trapezoidal planar shape, and has a first reflecting surface 21a, a second reflecting surface 21b, a third reflecting surface 21c, and a fourth reflecting surface 21d as the side surfaces. Further, the light guide member 21 also has an upper surface 21e and a lower surface 21f opposed to each other and contiguous to the first through fourth reflecting surfaces 21a, 21b, 21c, and 21d. Here, the first and second reflecting surfaces 21a, 21b extend along the Y-Z plane, and are distant from each other as much as the thickness t of the light guide member 21. Further, the third reflecting surface 21c is tilted an acute angle α no larger than 45° with respect to the Y-Z plane, and the fourth reflecting surface 21d is tilted an acute angle β no larger than 45° with respect to the X-Y plane. The first light axis AX1 passing through the third reflecting surface 21c and the second light axis AX2 passing through the fourth reflecting surface 21d are disposed in parallel to each other and are distant from each other as much as the distance D. It should be noted that an edge surface 21h is disposed between the first reflecting surface 21a and the third reflecting surface 21c so as to eliminate the ridge. It results that the light guide member 21 has a polyhedral outer shape composed of seven surfaces including the edge surface 21h described above.

The light guide member 21 is for performing light guide using the total reflection by the first and second reflecting surfaces 21a, 21b, and there exist a direction to be turned by reflection in the light guide process, and a direction not to be turned by reflection in the light guide process. When considering the image to be guided by the light guide member 21, the lateral direction along which the light propagates while being folded by a plurality of times of reflection in the light guide process, namely a confinement direction, is perpendicular (parallel to the X axis) to the first and second reflecting surfaces 21a, 21b, and corresponds to the second direction D2 of the liquid crystal display device 32 in the case of developing the light path to the light source side. On the other hand, the vertical direction along which the light propagates without being folded by reflection in the light guide process, namely a nonconfinement direction, is parallel (parallel to the Y axis) to the first and second reflecting surfaces 21a, 21b, and further the third reflecting surface 21c, and corresponds to the first direction D1 of the liquid crystal display device 32 in the case of developing the light path to the light source side as described later. It should be noted that in the light guide member 21, the principal light guide direction along which the light beam propagating therein proceeds is set to +Z direction.

The light guide member 21 is made of a resin material exhibiting high light transmitting property in the visible range. The light guide member 21 is a block-like member molded integrally by injection molding, and is formed by, for example, injecting a thermal or photochemical polymerization resin material inside the molding die and then causing thermal cure or light cure therein. Although the light guide member 21 is an integral-molding product as described above, it is possible to functionally divide it into a light entrance section B1, a light guide section B2, and a light exit section B3.

The light entrance section B1 is a part having a triangular prism shape, and has a light entrance surface IS as a part of the first reflecting surface 21a, and the third reflecting surface 21c opposed to the light entrance surface IS. The light entrance surface IS is a plane for taking in the image light GL from the image forming device 10 and located on the reverse side or the observer side, and extends perpendicularly to the first light axis AX1 of the projection optical system 12 so as to be opposed to the projection optical system 12. The third reflecting surface 21c has a rectangular outline, and has a total reflection mirror layer, which reflects the image light GL having passed through the light entrance surface IS to thereby guide it inside the light guide section B2, formed in the entire rectangular area. The total reflection mirror layer is formed by performing deposition on a tilted surface RS of the light guide member 21 using evaporation of aluminum or the like. The third reflecting surface 21c is tilted, for example, an acute angle α of 25° through 27° with respect to the first light axis AX1 of the projection optical system 12 or the X-Y plane, and folds the image light GL, which enters the light entrance surface IS and then proceeds in the −X direction as a whole, so as to proceed in the direction shifted to the +X direction as a whole, thereby surely coupling the image light GL on the inside of the light guide section B2.

The light guide section 32 has the first reflecting surface 21a and a second reflecting surface 21b each for totally reflecting the image light bent by the light entrance section E1 as a pair of planes opposed to each other and extending in parallel to the Y-Z plane. The distance between the first and second reflecting surfaces 21a, 21b, namely the thickness t of the light guide member 21 is set to, for example, about 9 mm. It is assumed here that the first reflecting surface 21a is located on the reverse side or the observer side near to the image forming device 10, and the second reflecting surface 21b is located on the obverse side or the external side far from the image forming device 10. In this case, the first reflecting surface 21a forms a surface part common to the light entrance surface IS described above and the light exit surface OS described later. The first and second reflecting surfaces 21a, 21b are each a total reflection surface using the refractive index difference, and the surfaces are covered by a hard coat layer in order for preventing the damage of the surfaces to thereby prevent degradation of the resolution of the picture although not provided with a reflection coat such as a mirror layer. The hard coat layer is formed by depositing a coat material including resin or the like on the light guide member 21 using a dipping process or a spray coating process.

The image light GL having been reflected by the third reflecting surface 21c of the light entrance section B1 firstly enters the first reflecting surface 21a, and is then totally reflected. Subsequently, the image light GL enters the second reflecting surface 21b, and is then totally reflected. By subsequently repeating the actions described above, the image light is guided in the principal light guide direction on the back side of the light guide device 20, namely to the side where the light exit section B3 is disposed, as a whole. It should be noted that since the first and second reflecting surfaces 21a, 21b are not provided with the reflection coat, the external light or the outside light externally entering the second reflecting surface 21b passes through the light guide section B2 at a high transmittance. In other words, the light guide section B2 is arranged to be a see-through type through which the external image can be seen.

The light exit section B3 is a part having a triangular prism shape, and has a light exit surface OS as a part of the first reflecting surface 21a, and the fourth reflecting surface 21d opposed to the light exit surface OS. The light exit surface OS is an obverse side plane for emitting the image light GL toward the eye EY of the observer, and forms a part of the first reflecting surface 21a similarly to the case of the light entrance surface IS, and extends perpendicularly to the second light axis AX2. The distance D between the second light axis AX2 passing through the light exit section B3 and the first light axis AX1 passing through the light entrance section B1 is set to, for example, 50 mm taking the width of the head of the observer and so on into consideration. The fourth reflecting surface 21d is a rectangular flat surface for reflecting the image light GL, which has entered there via the first and second reflecting surfaces 21a, 21b, and emitting it to the outside of the light exit section B3. The fourth reflecting surface 21d is attached with a half mirror layer 28. The half mirror layer 28 is a reflecting film (i.e., a semi-transmissive reflecting film) having a light transmitting property. The half mirror layer (the semi-transmissive reflecting film) 28 is formed by depositing a metal reflecting film or a dielectric multilayer film on a tilted surface RS constituting the fourth reflecting surface 21d out of the light guide member 21. The reflectance of the half mirror layer 28 with respect to the image light GL is set to be no lower than 10% and no higher than 50% in the assumed incident angle range of the image light GL from the view point of making the see-through observation of the external light GL' easy. The reflectance of the half mirror layer 28 with respect to the image light GL in a specific example is set to, for example, 20%, and the transmittance with respect to the image light GL is set to, for example, 80%.

The fourth reflecting surface 21d is tilted, for example, an angle α of 25° through 27° with respect to the second light axis AX2 perpendicular to the first reflecting surface 21a or the Y-Z plane, and the image light GL, which has entered there via the first and second reflecting surfaces 21a, 21b of the light guide section B2, is partially reflected to thereby bend it so as to proceed in the +X direction as a whole using the half mirror layer 28 described above, and is thus transmitted through the light exit surface OS. It should be noted that the component of the image light transmitted through the fourth reflecting surface 21d enters the light transmissive member 23, and is not used for forming the picture.

The light transmissive member 23 has the same refractive index as that of the main body of the light guide member 21, and has a first surface 23a, a second surface 23b, and a third surface 23c. The first and second surfaces 23a, 23b extends along the Y-Z plane. Further, the third surface 23c is tilted with respect to the Y-Z plane, and is disposed so as to be opposed in parallel to the fourth reflecting surface 21d of the light guide member 21. In other words, the light transmissive member 23 is arranged to be a member having a wedge-shaped member held between the second surface 23b and the third surface 23c. The light transmissive member 23 is made of a resin material exhibiting high light transmitting property in the visible range similar to the light guide member 21. The light transmissive member 23 is a block-like member molded integrally by injection molding, and is formed by, for example, injecting a thermal polymerization resin material inside the molding die and then causing thermal cure therein.

In the light transmissive member 23, the first surface 23a is disposed on an extended plane of the first reflecting surface 21a provided to the light guide member 21, and is located on the reverse side near to the eye EY of the observer, and the second surface 23b is disposed on an extended plane of the second reflecting surface 21b provided to the light guide member 21, and is located on the obverse side far from the eye EY of the observer. The third surface 23c is a rectangular light transmissive surface bonded to the fourth reflecting surface 21d of the light guide member 21 with an adhesive. The angle formed between the first surface 23a and the third surface 23c described above is arranged to be equal to the angle ε formed between the second reflecting surface 21b and the fourth reflecting surface 21d of the light guide member 21, and the angle formed between the second surface 23b and the third surface 23c is arranged to be equal to the angle β formed between the first reflecting surface 21a and the third reflecting surface 21c of the light guide member 21.

The light transmissive member 23 and the light guide member 21 constitute a see-through section B4 in the bonding section of the both members and the vicinity thereof. Specifically, the first and second surfaces 23a, 23b are not provided with a reflection coat such as a mirror layer, and therefore, transmit the external light GL' at a high transmittance similar to the light guide section B2 of the light guide member 21. Although the third surface 23c can also transmit the external light GL' at a high transmittance, since the fourth reflecting surface 21d of the light guide member 21 has the half mirror layer 28, the external light GL' passing through the third surface 23c fades, for example, 20% in the half mirror layer 28. In other words, it results that the observer observes the light obtained by overlapping the image light GL having faded to 20% and the external light GL' having faded to 80% through the half mirror layer 28.

C. General Outline of Light Path of Image Light

FIG. 3A is a diagram for explaining the light path in the first direction D1 corresponding to a vertical cross-sectional surface CS1 of the liquid crystal display device 32. In the vertical cross-sectional surface along the first direction D1, namely the Y-Z plane (the X'-Y' plane after the development), out of the image light having been emitted from the liquid crystal display device 32, a component emitted from an upper end side (+Y side) of the display area 32b indicated by the dashed-dotted line in the drawing is referred to as image light GLa, and a component emitted from the lower end side (−Y side) of the display area 32b indicated by the dashed-two dotted line in the drawing is referred to as image light GLb.

The image light GLa on the upper side is converted by the projection optical system 12 including the aspect ratio conversion optical system 15 into a parallel light beam, and enters the eye EY of the observer along the developed light axis AX' through the light entrance section B1, the light guide section B2, and the light exit section B3 of the light guide member 21 in a state of the parallel light beam from above with an angle $\phi_1$ in a tilted state. On the other hand, the image light GLb on the lower side is converted by the projection optical system 12 into a parallel light beam, and enters the eye EY of the observer along the developed light axis AX' through the light entrance section B1, the light guide section B2, and the light exit section B3 of the light guide member 21 in a state of the parallel light beam from beneath with an angle $\phi_2$ ($|\phi_2|=|\phi_1|$) in a tilted state. The angles $\phi_1$, $\phi_2$ described above correspond respectively to upper and lower half field angles, and are set to, for example, 6.5°.

FIG. 3B is a diagram for explaining the light path in the second direction (the confinement direction or a combination direction) D2 corresponding to a horizontal cross-sectional surface CS2 of the liquid crystal display device 32. In the horizontal cross-sectional surface CS2 along the second direction D2 (the confinement direction or the combination direction), namely the X-Z plane (the plane after the development), out of the image light having been emitted from the liquid crystal display device 32, a component emitted from a first display point P1 on a right end side (+Z side) toward the display area 32b indicated by the dashed-dotted line in the drawing is referred to as image light GLc, and a component emitted from a second display point P2 of the left end side (−Z side) toward the display area 32b indicated by the dashed-two dotted line in the drawing is referred to as image light GLd. In FIG. 3B, image light GLe emitted from an inner area shifted to the right and image light GLf emitted from an inner area shifted to the left are added for the purpose of reference.

The image light GLc from the first display point P1 on the observer's right is converted by the projection optical system 12 into a parallel light beam, and enters the eye EY of the observer along the developed light axis AX' through the light entrance section B1, the light guide section B2, and the light exit section B3 of the light guide member 21 in a state of the parallel light beam from the right with an angle $\theta_1$ in a tilted state. Meanwhile, the image light GLd from the second display point P2 on the observer's left is converted by the projection optical system 12 into a parallel light beam, and enters the eye EY of the observer along the developed light axis AX' through the light entrance section B1, the light guide section B2, and the light exit section B3 of the light guide member 21 in a state of the parallel light beam from the left with an angle $\theta_2$ ($|\theta_2|=|\theta_1|$) in a tilted state. The angles $\theta_1$, $\theta_2$ described above correspond respectively to right and left half field angles, and are set to, for example, 10°.

It should be noted that regarding the lateral direction of the second direction D2, since the image lights GLc, GLd are folded in the light guide member 21 by reflection, and the number of times of reflection is different therebetween, each of the image lights GLc, GLd is expressed in the light guide member 21 in a discontinuous manner. Further, regarding the eye EY of the observer, the viewing direction is flipped vertically compared to the case shown in FIG. 2A. As a result, although the screen is flipped horizontally as a whole regarding the lateral direction, the right half image of the liquid crystal display device 32 and the left half image of the liquid crystal display device 32 become continuously connected to each other without a displacement by processing the light guide member 21 with high accuracy as described later in detail. It should be noted that the emission angle $\theta_1'$ of the image light GLc on the right and the emission angle $\theta_2'$ of the image light GLd on the left are set differently taking the fact that the number of times of reflection in the light guide member 21 is different between the both image lights GLc, GLd into consideration.

According to the configuration described above, the image lights GLa, GLb, GLc, and GLd entering the eye EY of the observer are arranged to be the virtual image from infinity, the picture formed on the liquid crystal display device 32 is erected with respect to the vertical first direction D1, and the picture formed on the liquid crystal display device 32 is inverted with respect to the horizontal second direction D2.

D. Light Path of Image Light Regarding Lateral Direction

Figure 4:
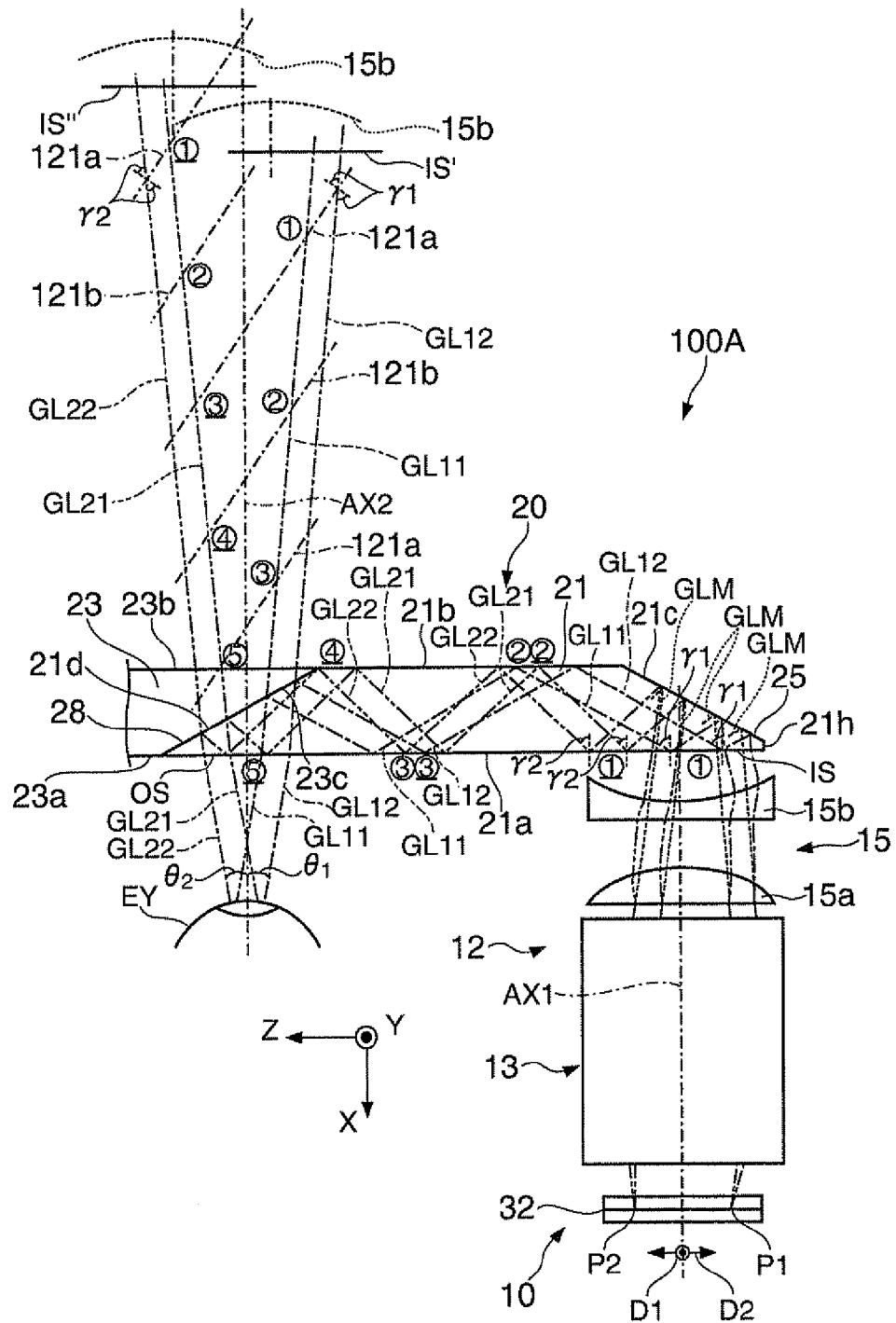
FIG. 4 is a plan view for specifically explaining the light path in the optical system of the virtual image display device.

FIG. 4 is a cross-sectional view for explaining the specific light path in the horizontal second direction D2 in the first display device 100A. As already described, the projection optical system 12 has the collimating lens 13 composed of a plurality of lenses (not shown) and the aspect ratio conversion optical system 15 for converting the aspect ratio with respect to the virtual image in the image area. The aspect ratio conversion optical system 15 is composed of a pair of cylindrical lenses 15a, 15b. The aspect ratio conversion optical system 15 uses the pair of cylindrical lenses 15a, 15b having optical surfaces different in curvature radius between the vertical direction and the lateral direction to thereby vary the incident angle of the image light, which is converted by the collimating lens 13 into the parallel light beam, to the eye EY of the observer while keeping the parallel state thereof, and thus making the conversion of the aspect angle by the adjustment of the field angle possible. Here, as an example, the horizontal to vertical ratio in the image area of the image display device 11, namely the aspect ratio is set to 4:3, and the conversion of the ratio is performed thereon so that the aspect ratio of 16:9 is obtained when the observer recognizes it as a virtual image. It should be noted that the details of the aspect ratio conversion operation by the aspect ratio conversion optical system 15 will be described later.

Image lights GL11, GL12 from the first display point P1 on the right of the liquid crystal display device 32 are converted into a parallel light beam by passing through the collimating lens 13 of the projection optical system 12. Further, the image lights GL11, GL12 pass through the aspect ratio conversion optical system 15 of the projection optical system 12 to thereby be adjusted in the light path direction with respect to the lateral direction for the aspect ratio conversion while keeping the state of the parallel light beam thus converted into. In other words, the aspect ratio conversion optical system 15 adjusts the field angle in the lateral direction to thereby perform the adjustment for the aspect ratio conversion in the image area of the liquid crystal display device 32 with respect to the image to be displayed.

The image lights GL11, GL12 having passed through the projection optical system 12 enter the light entrance surface IS of the light guide member 21. The image lights GL11, GL12 introduced in the light guide member 21 repeat total reflection on the first and second reflecting surfaces 21a, 21b at the same angle, and are finally emitted from the light exit surface OS as a parallel light beam. Specifically, the image lights GL11, GL12 are reflected by the third reflecting surface 21c of the light guide member 21 as a parallel light beam, then enter the first reflecting surface 21a of the light guide member 21 at a first reflection angle γ1, and are then totally reflected (first total reflection). Subsequently, the image lights GL11, GL12 enter the second reflecting surface 21b to be totally reflected (second total reflection), and then enter the first reflecting surface 21a again to be totally reflected (third total reflection) in the state of keeping the first reflection angle γ1.

As a result, the image lights GL11, GL12 are totally reflected on the first and second reflecting surfaces 21a, 21b three times in total, and then enter the fourth reflecting surface 21d. The image lights GL11, GL12 are reflected on the fourth reflecting surface 21d at an angle equal to the angle with respect to the third reflecting surface 21c, and are then emitted from the light exit surface OS at an angle $\theta_1$ with the direction of the second light axis AX2 perpendicular to the light exit surface OS as the parallel light beam.

The image lights GL21, GL22 from the second display point P2 on the left of the liquid crystal device 32 are converted into a parallel light beam by passing through the collimating lens 13 of the projection optical system 12, then adjusted in the light path while keeping the state of the parallel light beam thus converted into in the passage through the aspect ratio conversion optical system 15, and then enter the light entrance surface IS of the light guide member 21. The image lights GL21, GL22 introduced in the light guide member 21 repeat total reflection on the first and second reflecting surfaces 21a, 21b at the same angle, and are finally emitted from the light exit surface OS as a parallel light beam. Specifically, the image lights GL21, GL22 are reflected by the third reflecting surface 21c of the light guide member 21 as a parallel light beam, then enter the first reflecting surface 21a of the light guide member 21 at a second reflection angle γ2 (γ2<γ1), and are then totally reflected (first total reflection). Subsequently, the image lights GL21, GL22 enter the second reflecting surface 21b to be totally reflected (second total reflection), then enter the first reflecting surface 21a again to be totally reflected (third total reflection), then enter the second reflecting surface 21b again to be totally reflected (fourth total reflection), and then enter the first reflecting surface 21a again to be reflected (fifth total reflection) in the state of keeping the second reflection angle γ2. As a result, the image lights GL21, GL22 are totally reflected on the first and second reflecting surfaces 21a, 21b five times in total, and then enter the fourth reflecting surface 21d. The image lights GL21, GL22 are reflected on the fourth reflecting surface 21d at an angle equal to the angle with respect to the third reflecting surface 21c, and are then emitted from the light exit surface OS at an angle $\theta_2$ with the direction of the second light axis AX2 perpendicular to the light exit surface OS as the parallel light beam.

In FIG. 4, there are drawn an imaginary first surface 121a corresponding to the first reflecting surface 21a when developing the light guide member 21, and an imaginary second surface 121b corresponding to the second reflecting surface 21b when developing the light guide member 21. By developing the light guide member 21 as described above, it is understood that the image lights GL11, GL12 from the first display point P1 pass through an entrance equivalent surface IS' corresponding to the light entrance surface IS, and then emitted from the light exit surface OS to thereby enter the eye EY of the observer after passing through the first surface 121a twice and the second surface 121b once, and the image lights GL21, GL22 from the second display point P2 pass through an entrance equivalent surface IS" corresponding to the light entrance surface IS, and then emitted from the light exit surface OS to thereby enter the eye EY of the observer after passing through the first surface 121a three times and the second surface 121b twice. From a different view point, it results that the observer makes the observation while making the lenses 15b of the projection optical system 12, which exist in the vicinities of the two entrance equivalent surfaces IS', IS" located differently from each other, overlap with each other.

Figure 5A:
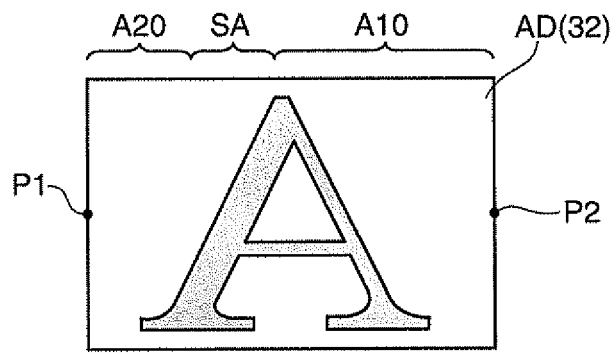
FIG. 5A is a diagram showing a display surface of a liquid crystal display device.
Figure 5B:
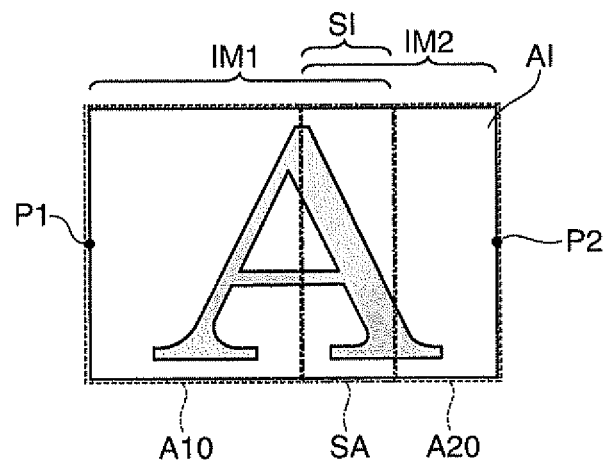
FIG. 5B is a diagram for conceptually explaining the virtual image of the liquid crystal display device viewed by the observer.
Figure 5C:
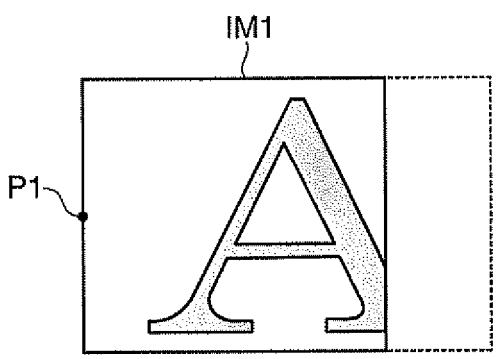
FIGS. 5C and 5D are diagrams for explaining partial images constituting the virtual image.
Figure 5D:
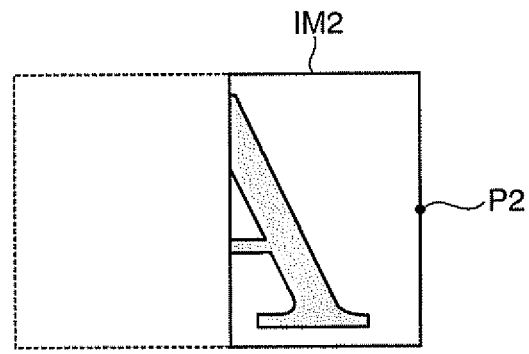

FIG. 5A is a diagram for conceptually explaining a display surface of the liquid crystal display device 32, FIG. 5B is a diagram for conceptually explaining the virtual image of the liquid crystal display device 32 viewed by the observer, and FIGS. 5C and 5D are diagrams for explaining partial images constituting the virtual image. A rectangular image forming area AD provided to the liquid crystal display device 32 shown in FIG. 5A is observed as a virtual image display area AI shown in FIG. 5B. In the left part of the virtual image display area AI, there is formed a first projection image IM1 corresponding to a part located in a range from the center to the right side of the image forming area AD of the liquid crystal device 32, and the first projection image IM1 is formed as a partial image lacking the right side as shown in FIG. 5C. Further, in the right part of the virtual image display area AI, a second projection image IM2 corresponding to a part located in a range from the center to the left side of the image forming area AD of the liquid crystal device 32 is formed as a virtual image, and the second projection image IM2 is formed as a partial image lacking the left half side as shown in FIG. 5D.

A first partial area MO for forming only the first projection image (the virtual image) IM1 out of the liquid crystal display device 32 shown in FIG. 5A includes, for example, the first display point P1 on the right end of the liquid crystal display device 32, and emits the image lights GL11, GL12 to be totally reflected in the light guide section B2 of the light guide member 21 three times in total. A second partial area A20 for forming only the second projection image (the virtual image) IM2 out of the liquid crystal display device 32 includes, for example, the second display point P2 on the left end of the liquid crystal display device 32, and emits the image lights GL21, GL22 to be totally reflected in the light guide section B2 of the light guide member 21 five times in total. The image light from a band SA sandwiched by the first and second partial areas A10, A20 in the central area of the image forming area AD of the liquid crystal display device 32, and extending to form a vertically elongated shape forms an overlapping image SI shown in FIG. 5B. In other words, it results that the image light from the band SA of the liquid crystal device 32 forms the first projection image IM1 formed by the image lights GL11, GL12 totally reflected in the light guide section B2 three times in total and the second projection image IM2 formed by the image lights GL21, GL22 totally reflected in the light guide section B2 five times in total, and the projection images overlap with each other on the virtual image display area AI. If the processing of the light guide member 21 is precise and the light beam accurately collimated is formed by the projection optical system 12, the displacement and blur due to the overlap of the two projection images IM1, IM2 can be prevented with respect to the overlapping image SI.

Although it is assumed hereinabove that the number of times of total reflection of the image lights GL11, GL12 emitted from the first partial area A10 including the first display point P1 on the right of the liquid crystal display device 32 by the first and second reflecting surfaces 21a, 21b is three in total, and the number of times of total reflection of the image lights GL21, GL22 emitted from the second partial area A20 including the second display point P2 on the left of the liquid crystal display device 32 by the first and second reflecting surfaces 21a, 21b is five in total, the numbers of times of total reflection can arbitrarily be changed. Specifically, it is also possible to set the number of times of total reflection of the image lights GL11, GL12 to five in total and to set the number of times of total reflection of the image lights GL21, GL22 to seven in total by adjusting the outer shape (i.e., the thickness t, the distance D, and the acute angles α, β) of the light guide member 21. Further, although it is assumed hereinabove that the number of times of total reflection of the image lights GL11, GL12, GL21, and GL22 is an odd number, if the light entrance surface IS and the light exit surface OS are disposed on the respective sides opposite to each other, namely if the light guide member 21 is formed to have a parallelogram planar shape, the number of times of total reflection of the image lights GL11, GL12, GL21, and GL22 becomes an even number.

Here, returning to FIG. 4, the adjustment of the light paths of the image lights GL11, GL12, GL21, and GL22 by the aspect ratio conversion optical system 15 of the projection optical system 12 will be explained. In the image forming process as described above, the aspect ratio conversion optical system 15 adjusts the light paths of the image lights GL11, GL12, GL21, and GL22 so as to be wider-angle than in the normal case to thereby perform the conversion of the horizontal to vertical ratio, namely the aspect ratio. Specifically, as indicated by the broken line in the drawing, if the aspect ratio conversion optical system 15 does not exist, an imaginary light path GLM becomes the light path of the image light. The imaginary light path GLM is arranged to enter the light guide member 21 and so on at an angle narrower than that of the light paths of the actual image lights GL11, GL12, GL21, and GL22, and in this case, it results that the image with the aspect ratio of 4:3 is formed while keeping the state in the image area of the image display device 11. In contrast, in the present embodiment, the light paths of the image lights are adjusted by the aspect ratio conversion optical system 15. Thus, even if the image area has the aspect ratio of 4:3 on the image display device 11 side, the observer can recognize it as a picture having a more landscape-oriented aspect ratio of 16:9. It should be noted that the aspect ratio conversion optical system 15 is arranged to be located in the posterior stage of the collimating lens 13 in the projection optical system 12 to thereby exert a horizontally extending action for the aspect ratio conversion described above on the image light in the state of the parallel light beam thus converted into. Therefore, it becomes possible for the component of the image light to keep the state of the parallel light beam thus converted into when passing through the aspect ratio conversion optical system 15.

E. Structure of Aspect Ratio Conversion Optical System and Aspect Ratio Conversion Using the Same Hereinafter, the structure and the function of the aspect ratio conversion optical system 15 will be explained in more detail with reference to FIGS. 6A through 6C, and 7A through 7C. It should be noted that in order for giving priority to the explanation of the aspect ratio conversion optical system 15, other mechanisms, light paths, and so on are shown schematically in FIGS. 6A and 6B. Further, as conceptually illustrated in FIG. 7A, here, the aspect ratio conversion optical system 15 shown in, for example, FIG. 6A performs the angle conversion of the light beam only in the lateral direction to thereby perform the aspect ratio conversion on the panel image PP corresponding to the picture to be recognized by the observer, and thus the aspect ratio thereof is changed from the original value of 4:3 to 16:9. It should be noted that as conceptually shown in FIG. 7B as a comparative example, if it is assumed that the aspect ratio conversion optical system 15 is not disposed, the aspect conversion as described above is not performed, and the panel image PP remains to have the original aspect ratio of 4:3 of the screen of the image display device 11.

Figure 6A:
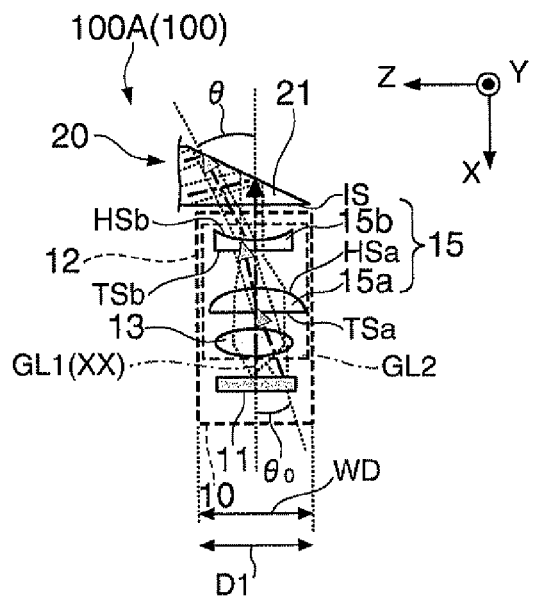
FIG. 6A is a cross-sectional view schematically showing the structure of the virtual image display device.
Figure 6B:
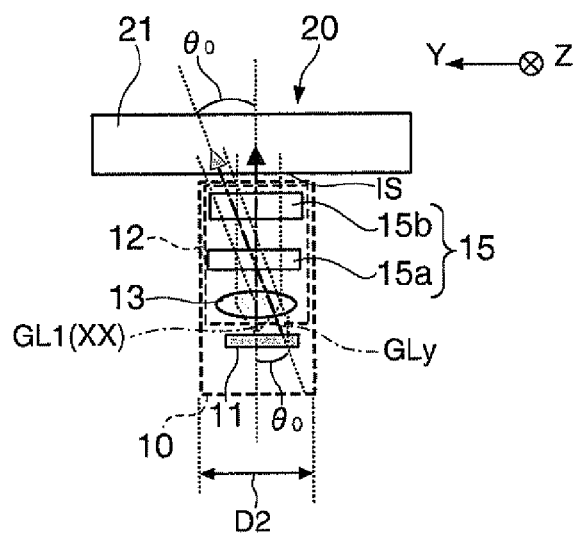
FIG. 6B is a side view thereof.
Figure 6C:
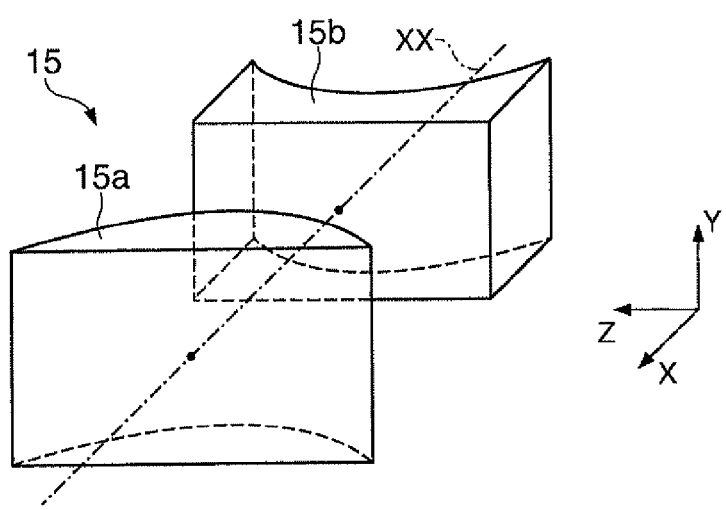
FIG. 6C is a perspective view of a pair of cylindrical lenses constituting an aspect ratio conversion optical system.
Figures 7A, 7B:
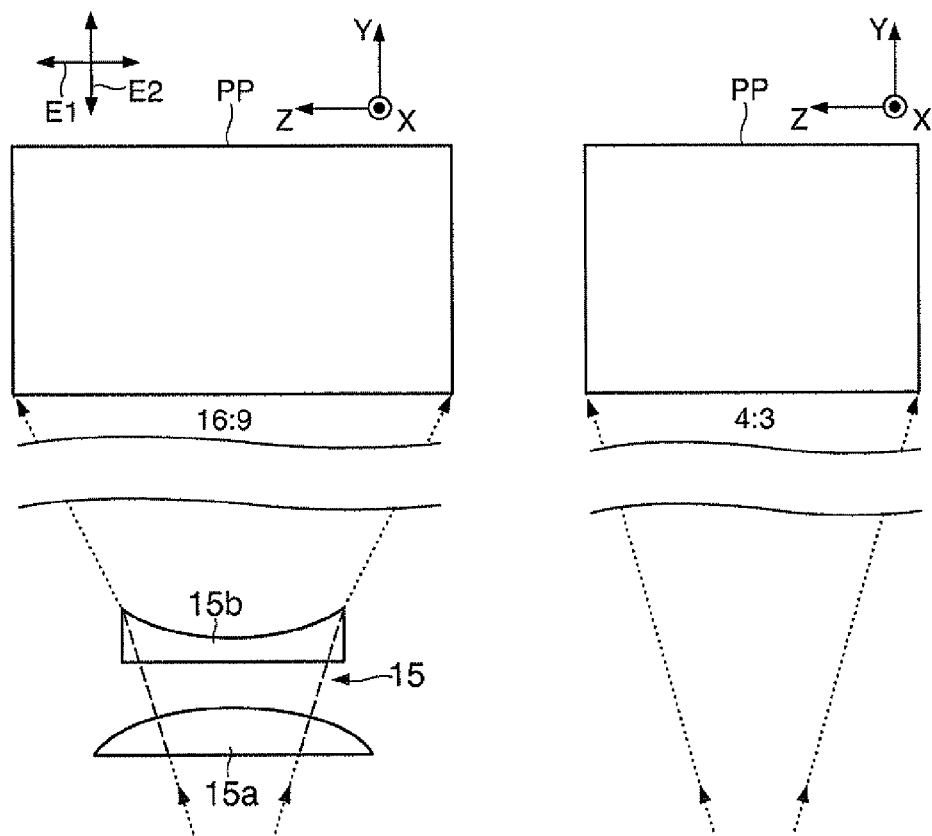
FIG. 7A is a schematic diagram showing a panel image corresponding to the virtual image recognized by the observer.
FIG. 7B is a diagram of a comparative example.

FIG. 6A is a cross-sectional view of the virtual image display device 100 viewed from the Y direction, FIG. 6B is a side view of the virtual image display device 100 viewed from the Z direction, and FIG. 6C is a perspective view of the pair of cylindrical lenses 15a, 15b constituting the aspect ratio conversion optical system 15. In the virtual image display device 100 shown in the drawing, the first direction D1 as the lateral direction of the image display device 11 corresponds to a lateral direction of the observer, namely a lateral direction E1 of the panel image PP, as shown in FIG. 7A. Further, the second direction D2, which is a vertical direction of the image display device 11 perpendicular to the first direction D1, corresponds to a vertical direction E2 of the panel image PP.

The aspect ratio conversion optical system 15 is composed of a convex cylindrical lens 15a disposed on the upstream side of the light path, namely the light source side, and a concave cylindrical lens 15b disposed on the downstream side of the light path, namely the anti-light source side. The convex cylindrical lens 15a and the concave cylindrical lens 15b are each a cylindrical optical system disposed so that the generatrix extends in the Y direction, having a circular arc shape providing a positive or negative refractive power with respect to a cross-sectional surface parallel to the X-Z plane, having a linear shape not providing a refractive power with respect to a cross-sectional surface parallel to the X-Y plane, and having an overall exterior appearance illustrated by the perspective view in FIG. 6C. Each of the cylindrical lenses 15a, 15b is disposed so as to be opposed directly or indirectly to the light entrance surface IS of the light guide member 21. Since each of the cylindrical lenses 15a, 15b has the shape and the arrangement described above, there exist an orientation in which the diffusion action or the convergence action of the light passing therethrough, namely the expansion action or the contraction action of the image light, occurs and an orientation in which such actions do not occur due to the difference in the cross-sectional shape. It should be noted that in the case of the cylindrical lenses 15a, 15b shown in, for example, FIG. 6A as an example, surfaces HSa, HSb on the downstream side of the light path are formed as curved surfaces, and surfaces TSa, TSb on the upstream side of the light path are formed as flat surfaces.

As shown in FIGS. 6A and 6B, the image light having entered the aspect ratio conversion optical system 15 has previously been collimated by the collimating lens 13. The aspect ratio conversion optical system 15 is an afocal system for performing the conversion so as to widen the field angle while maintaining the parallelism of the light beam of each of the image lights on the X-Z cross-sectional surface corresponding to the first direction D1, namely the optical system with an infinite focal distance, and emits the incident parallel light beam while maintaining the parallelism thereof. On the other hand, the aspect ratio conversion optical system 15 is arranged to be a non-acting optical system, which maintains the parallelism of the light beam of each of the image lights and keeps the field angle on the X-Y cross-sectional surface corresponding to the second direction D2. Therefore, in FIG. 6A, namely in the X-Z plane, the image light GL1, for example, enter there as a parallel light beam and is emitted as the parallel light beam although the emission angle thereof is varied. Further, in FIG. 6B, namely in the X-Y plane, the image light GL1, for example, enter there as a parallel light beam and is emitted as roughly the same parallel light beam. Here, the expansion or contraction of the light beam cross-section of the image light by the aspect ratio conversion optical system 15 with respect to the first direction D1, namely the lateral direction, corresponds to the increase or decrease in the emission angle, and is determined by the refractive power and the distance of the both cylindrical lenses 15a, 15b constituting the aspect ratio conversion optical system 15. In the case of the arrangement of the lenses 15a, 15b shown in, for example, FIG. 6A, the lateral field angle ϕ=2θ is widen with respect to the Z direction to thereby expand the image light compared to the case in which the lenses 15a, 15b namely the aspect ratio conversion optical system 15 is not present. In contrast, it is arranged that neither expansion nor contraction occurs with respect to the second direction D2, namely the vertical direction.

Figure 7C:
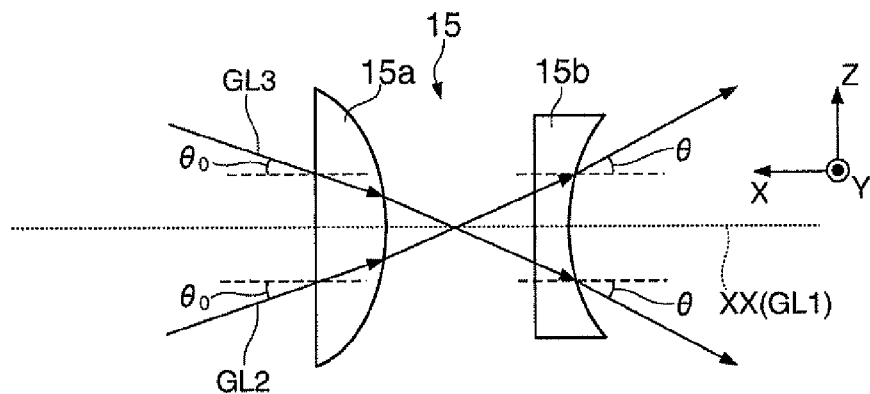
FIG. 7C is a schematic diagram for explaining a light path in the aspect ratio conversion optical system.

Hereinafter, the adjustment of the light path of the image light with respect to the first direction D1, namely the lateral direction, on the image forming device 10 side will be explained with reference to FIG. 6A and so on. Here, in order for explaining the aspect ratio conversion due to the light path adjustment in the aspect ratio conversion optical system 15, a component of the image light emitted from the peripheral side of the image display device 11 while tilted as much as the incident angle $\theta_0$ and intersecting the light axis XX such as the image lights GL2, GL3 shown in FIG. 7C is considered. Firstly, when entering the convex cylindrical lens 15a, such a component is emitted from the +Z side or the −Z side at a emission angle θ larger than the incident angle $\theta_0$ with respect to the light axis XX due to the convex cylindrical lens 15a and the concave cylindrical lens 15b as an afocal system. It should be noted that the emission angle θ is equal to the value of the horizontal half field angle θ of the virtual image shown in, for example, FIG. 6A. As described above, the emission angle θ becomes larger than the incident angle $\theta_0$, namely the angular magnification increases, with respect to the lateral direction by passing through the aspect ratio conversion optical system 15, and consequently, the field angle of the image light when the image light is emitted is widened compared to the field angle when the image light enters there. In other words, it results that the virtual image by the image light is expanded in the lateral direction compared to the case in which the aspect ratio conversion optical system 15 is not present.

In the configuration described above, by appropriately determining the positional relationship between the convex cylindrical lens 15a and the concave cylindrical lens 15b, and the ratio of the focal distance between these cylindrical lenses, it is possible to set the dimension of the emission angle θ with respect to the incident angle $\theta_0$ to a desired value, and as a result, it is possible to adjust the aspect ratio of the virtual image to be recognized by the observer to a desired ratio. It should be noted here that the expansion conversion for multiplying the dimension in the lateral direction by 4/3 is adopted, for example.

Hereinafter, returning to FIG. 6B, the light path of the image light with respect to the second direction D2, namely the vertical direction, on the image forming device 10 side will be explained. In this case, since each of the cylindrical lenses 15a, 15b does not have the refractive power, and is arranged to be equivalent to a parallel plate, either the component of the image light emitted from the peripheral side such as the image light GLy emitted from the −Y side of the image display device 11 or the component on the central side is hardly affected by the angular variation due to the aspect ratio conversion optical system 15. In other words, the image light is emitted while maintaining the same state without being expanded or contracted compared to the case in which the value of the incident angle $\theta_0$ is directly used as the emission angle $\theta_0$ and the aspect ratio conversion optical system 15 is not present, and then forms the virtual image.

As a result of the above, the aspect ratio conversion optical system 15 performs the conversion on the virtual image by the image light passing therethrough so as to expand it with respect to the lateral direction and to cause no substantial change with respect to the vertical direction compared to the case of lacking the aspect ratio conversion optical system 15.

In other words, the conversion is performed with the ratio different between the lateral direction and the vertical direction. In this case, by setting the expansion amount with respect to the lateral direction to the multiplication by 4/3 as described above, the conversion of the aspect ratio from 4:3 to 16:9 is performed by lateral expansion alone. Due to the conversion described above, it is possible to make the image light capable of forming the virtual image having the aspect ratio of 16:9 enter the light entrance surface IS of the light guide member 21. It should be noted that as shown in FIG. 6A, in the case of widening the field angle to thereby expand the virtual image in the lateral direction, the width of each of the parallel light beams passing through the light guide member 21 is narrowed. In contrast, as shown in FIG. 6B, in the case of performing neither expansion nor contraction, the width of each of the parallel light beams passing through the light guide member 21 is kept.

Figure 8B:
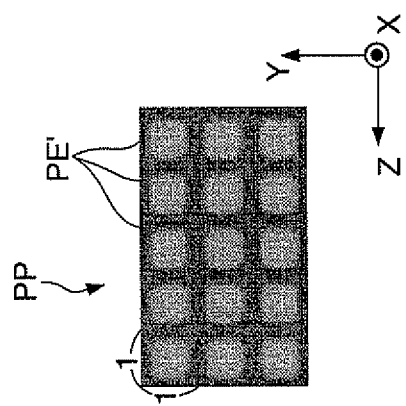
FIG. 8B is a diagram showing the state of the pixels of the panel image converted in the aspect ratio.
Figure 8A:
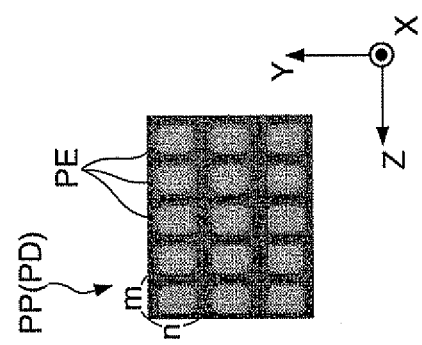
FIG. 8A is a diagram showing pixels of the panel image reflecting pixels of an image area of an image display element.

Hereinafter, the shape of the pixel constituting the image corresponding to the aspect ratio conversion described above will be explained. Firstly, FIG. 8A schematically shows the panel image PP in the condition in which no action by the aspect ratio conversion is exerted as what corresponds to the screen of the image display device 11. In this case, the shape of the panel image PP has a rectangular shape having the aspect ratio of 4:3 directly reflecting the shape of the image area PD of the image display device 11. Therefore, a number of pixels PE disposed in a matrix on the panel image PP can be treated as those representing the arrangement and the shape of the pixels of the image area PD in the image display device 11. In contrast, FIG. 8B schematically shows the panel image PP in the condition in which the aspect ratio is converted into 16:9 by the action due to the aspect ratio conversion by the aspect ratio conversion optical system 15. In FIG. 8B, each of the picture pixels PE' of the panel image PP corresponds one-to-one to each of the pixels PE in FIG. 8A. Here, as already described, the aspect ratio conversion by the aspect ratio conversion optical system 15 is set to the conversion of performing the multiplication by 4/3 in the lateral direction. In order for corresponding to the above, the shape of each of the pixels PE of the panel image PP in FIG. 8A is set to a vertically long rectangular shape having an aspect ratio inverse to the conversion ratio of the aspect ratio conversion optical system 15. In other words, the aspect ratio m:n of each of the pixels PE is set to m:n=3:4 which is elongated in a vertical direction, namely the Y direction. Thus, the shape of each of the picture pixels PE' of the panel image PP shown in FIG. 8B is converted by the aspect ratio conversion optical system 15 in an expanding manner at a conversion ratio of lateral multiplication by 4/3 to thereby be recognized by the observer as being in a square state with the aspect ratio of 1:1. As described above, by previously setting the shape of the pixel of the image display device 11, namely the shape of the pixel PE to be vertically long so as to correspond to the aspect ratio conversion by the aspect ratio conversion optical system 15, the picture reaching the eye EY of the observer after the aspect ratio conversion has the state of the original picture kept as a natural shape without modification without performing image processing or the like.

Figure 9A:
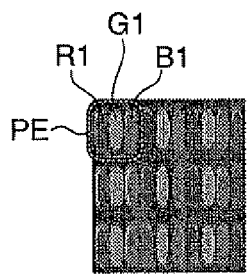
FIG. 9A is a diagram showing a state of RGB pixel segments arranged in a horizontal line before the conversion of the aspect ratio.
Figure 9B:
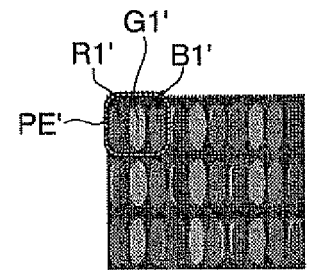
FIG. 9B is a diagram showing the state thereof after the conversion of the aspect ratio.
Figure 9C:
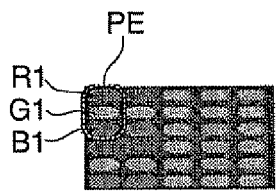
FIG. 9C is a diagram showing a state of RGB pixel segments arranged in a vertical line before the conversion of the aspect ratio.
Figure 9D:
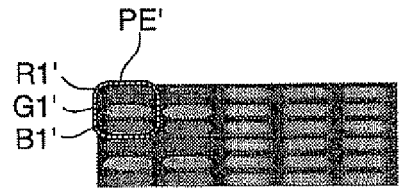
FIG. 9D is a diagram showing the state thereof after the conversion of the aspect ratio.

Hereinafter, pixel segments in the case of constituting each of the pixels PE by three segments will be explained. For example, as shown in FIGS. 9A and 9B, it is possible to form each of the pixels PE by a set of three colors, namely RGB (red, green, and blue), of vertically long pixel segments R1, G1, and B1 arranged in a horizontal line. In this case, in each of the pixels PE' after the aspect ratio conversion, each of pixel segments R1', G1', and B1' is expanded in a lateral direction. Therefore, by previously setting the pixel segments R1, G1, and B1 before the conversion to be vertically long, it is possible to arrange that each of the pixel segments R1', G1', and B1' after the conversion has the most preferable shape. Further, as shown in FIGS. 9C and 9D, it is also possible to arrange the three colors, namely RGB (red, green, and blue), of pixel segments R1, G1, and B1 in a vertical line. It should be noted that an arrangement type such as delta arrangement or mosaic arrangement can also be adopted besides the vertically or laterally striped arrangement described above. Since there are arrangement types, for example, providing eye-friendliness of vertical lines or suitable for graphical display depending on the arrangement types, suitable one can be selected from a variety of arrangement types in accordance with necessary characteristics.

Figure 9E:
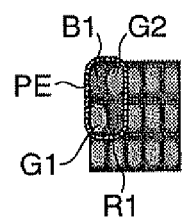
FIG. 9E is a diagram showing a state of RGB pixel segments disposed in four sections forming a square before the conversion of the aspect ratio.
Figure 9F:
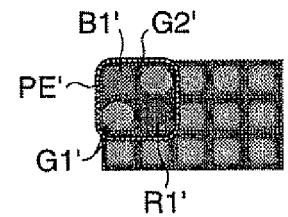
FIG. 9F is a diagram showing the state thereof after the conversion of the aspect ratio.
Figure 9G:
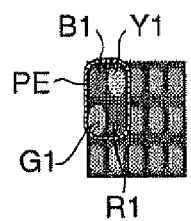
FIG. 9G is a diagram showing a state of four colors of pixel segments disposed in four sections forming a square before the conversion of the aspect ratio.
Figure 9H:
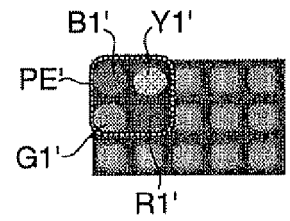
FIG. 9H is a diagram showing the state thereof after the conversion of the aspect ratio.

Further, besides the above, as shown in, for example, FIGS. 9E and 9F, it is also possible to arrange four pixel segments of the three colors, namely RGB (red, green, and blue), respectively to four sections forming a square to thereby constitute each of the pixels PE. In FIGS. 9E and 9F, as an example, it is arranged that pixel segments having coloration composed of one R segment, one B segment, and two G segments, namely the pixel segments R1, G1, G2, and B1 are arranged in a 2×2 matrix, and the square pixel PE' is formed by converting these pixel segments into pixel segments R1', G1', G2', and B1' (see FIG. 9F). Further, as shown in FIGS. 9G and 9H, it is also possible to arrange that each of the pixels PE is constituted by four pixel segments R1, G1, B1, and Y1 having four colors obtained by, for example, adding Y (yellow) to RGB (red, green, and blue), and the square pixel PE' is formed by converting the pixel segments R1, G1, B1, and Y1 thus arranged into the pixel segments R1', G1', B1', and Y1' by the aspect ratio conversion (see FIG. 9H). In the case of constituting the pixel with the four segments, it becomes possible to increase the light intensity or further enhance the color reproducibility by reinforcing green or adding yellow as described above. Further, the fourth color is not limited to Y (yellow), but can be set to W (white) instead.

As described above, the virtual image display device 100 according to the present embodiment is capable of converting the aspect ratio of the virtual image thus formed into the aspect ratio (16:9) laterally longer than the original aspect ratio (4:3) of the image area PD of the image display device 11 using the expansion conversion in the aspect ratio conversion optical system 15. Thus, the aspect ratio of the image light to be recognized as a virtual image by the eye of the observer can be adjusted to a desired state (e.g., the aspect ratio of 16:9) by the aspect conversion in the cylindrical lenses 15a, 15b even in the case in which, for example, the lateral width WD of the image forming device 10 including the image display device 11 with respect to the whole of the virtual image display device 100 is limited by a design requirement, and therefore, the image area PD fails to have the relatively landscape aspect ratio (e.g., 16:9) required as a picture, but has a ratio (e.g., the aspect ratio of 4:3) approximating square.

It should be noted that although in the aspect ratio conversion optical system 15 or the like in any one of the embodiment and the modified examples described above it is assumed that the aspect ratio of the display image of the image display device 11 side is 4:3, and the conversion is performed so as to set the aspect ratio of the virtual image by the image light to be recognized by the observer to 16:9, the aspect ratio is not limited thereto, but various values can be assumed with respect to the aspect ratio before the conversion and the aspect ratio after the conversion. The conversion ratio of the aspect ratio can be adjusted by, for example, changing the arrangement of the set of cylindrical lenses 15a, 15b having concave and convex shapes constituting the aspect ratio conversion optical system 15.

Further, in the virtual image display device 100 according to the embodiment explained hereinabove, the image light GL reflected by the third reflecting surface 21c of the light entrance section B1 is propagated while totally reflected by the first and second reflecting surfaces 21a, 21b of the light guide section B2, and then reflected by the fourth reflecting surface 21d of the light exit section B3 to thereby enter the eye EY of the observer as a virtual image. On this occasion, since the number of times of reflection of the first image lights GL11, GL12 emitted from the first display point 21 of the image display device 11 and the number of times of reflection of the second image lights GL21, GL22 emitted from the second display point 22 of the image display 11 are different from each other, it is possible to obtain a wide angular range of the emission angle of the image light GL emitted from the light exit section B3. In other words, it becomes possible to take in the image light GL from the partial areas A10, A20 different from each other in the image display device 11 at a relatively wide view angle, and thus, the large display size of the virtual image observed through the light exit section B3 can be assured. As described above, since the light exit section B3 can be enlarged so as to be able to cover the pupil without substantially increasing the thickness of the light guide section B2 by adopting the structure of taking out the image lights having the respective numbers of times of reflection different from each other, it becomes unnecessary to perform pupil splitting by moving the light exit section B3 closer to the pupil, a large eye ring diameter can be assured, and a preferable see-through observation also becomes possible.

Second Embodiment

Hereinafter, a virtual image display device according to a second embodiment will be explained with reference to FIG. 10A and so on. It should be noted that the virtual image display device 200 according to the present embodiment is a modified example of the virtual image display device 100 according to the first embodiment, and it is assumed that the constituents denoted with the same reference numerals as those of the virtual display device 100 according to the first embodiment have substantially the same function unless particularly explained.

Figure 10A:
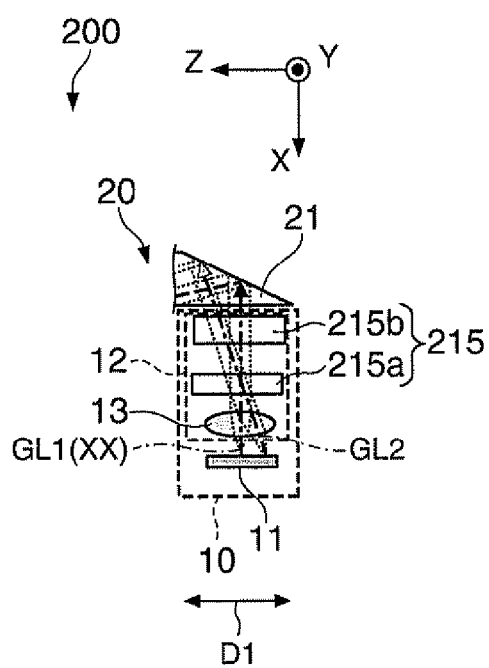
FIG. 10A is a cross-sectional view showing a virtual image display device according to a second embodiment of the invention.
Figure 10B:
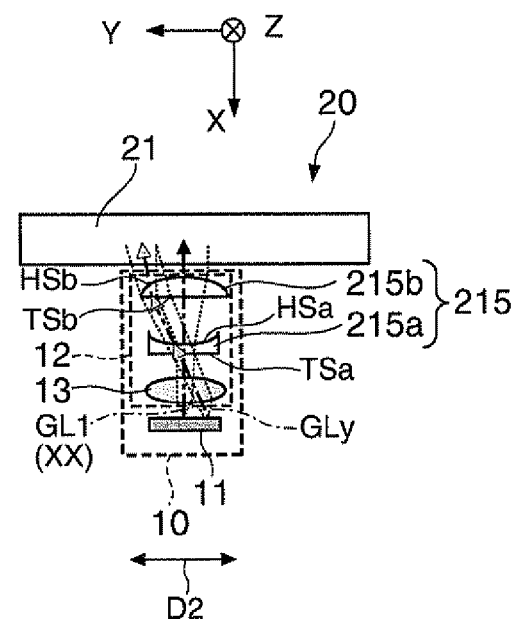
FIG. 10B is a side view thereof.

FIG. 10A is a cross-sectional view of the virtual image display device 200 viewed from the Y direction, and FIG. 10B is a side view of the virtual image display device 200 viewed from the Z direction. The virtual image display device 200 according to the present embodiment performs a contraction conversion in a aspect ratio conversion optical system 215 with respect to the second direction D2 (the Y direction) perpendicular to the first direction D1 (the Z direction) to thereby convert the virtual image to be observed to have the aspect ratio of the desired state. Here, as an example, it is assumed that the horizontal to vertical ratio, namely the aspect ratio, of the display image in the image display device 11 is 4:3, and the picture with the aspect ratio of 16:9 is made to be recognized by the observer by the contraction conversion as the aspect ratio conversion by the aspect ratio conversion optical system 215.

In order for performing the contraction conversion with respect to the second direction D2, namely the vertical direction, the aspect ratio conversion optical system 215 has a concave cylindrical lens 215a disposed on the upstream side of the light path, namely the light source side, and a convex cylindrical lens 215b disposed on the downstream side of the light path, namely the anti-light source side. More specifically, each of the cylindrical lenses 215a, 215b is a cylindrical optical system disposed so that the generatrix thereof extends in the Z direction, and having a linear shape of exerting no refractive power with respect to the cross-sectional shape parallel to the X-Z plane, and a circular arc shape of exerting the positive or negative refractive power with respect to the cross-sectional shape parallel to the X-Y plane. Thus, the aspect ratio conversion optical system 215 is arranged to be equivalent to the parallel plate and therefore provide no substantial change with respect to the X-Z plane, on the one hand, and is arranged to function as an afocal system for performing the conversion of narrowing the field angle while maintaining the parallelism of the light beam of the image light with respect to the X-Y plane, on the other hand.

According to the configuration described above, firstly, as shown in FIG. 10A, the light path with respect to the first direction D1, namely the Z direction, does not substantially affected by the angular variation due to the aspect ratio conversion optical system 215. In other words, the image light is emitted while keeping the same state without being expanded or contracted compared to the case of lacking the aspect ratio conversion optical system 215.

In contrast, as shown in FIG. 10B, the light path of the image light with respect to the second direction D2, namely the Y direction, is changed so that the emission field angle is narrowed compared to the entrance field angle due to the aspect ratio conversion optical system 215 as an afocal system. In other words, it results that the virtual image by the image light is contracted in the vertical direction compared to the case in which the aspect ratio conversion optical system 215 is not present.

As a result of the above, the aspect ratio conversion optical system 215 performs the vertical contraction conversion on the light beam cross-sectional shape of the whole of the image light passing therethrough so as to provide no substantial change with respect to the lateral direction, and to provide contraction with respect to the vertical direction. As described above, by performing the conversion with the ratio different between the lateral direction and the vertical direction, the conversion of the aspect ratio, for example, from 4:3 to 16:9 can be performed. It should be noted that in this case in order for achieving the conversion described above, it results that there is set the contraction conversion with a contraction amount of performing the multiplication by ¾ with respect to the vertical direction.

Third Embodiment

Hereinafter, a virtual image display device according to a third embodiment will be explained with reference to FIG. 11A and so on. It should be noted that the virtual image display device 300 according to the present embodiment is a modified example of the virtual image display device 100 according to the first embodiment, and it is assumed that the constituents denoted with the same reference numerals as those of the virtual display device 100 according to the first embodiment have substantially the same function unless particularly explained.

The virtual image display device 300 performs both of the expansion conversion with respect to the first direction D1 (the Z direction) corresponding to the lateral direction for the observer, and the contraction conversion with respect to the second direction D2 (the Y direction) perpendicular to the first direction D1 as the aspect ratio conversion.

In order for performing the expansion conversion with respect to the first direction D1, namely the lateral direction, and the contraction conversion with respect to the second direction D2, namely the vertical direction, the aspect ratio conversion optical system 315 disposes tonic lenses 315a, 315b having a saddle-like surface shape different in concavity and convexity between the cross-sectional directions. In other words, each of the tonic lenses 315a, 315b has a tonic shape, which has a circular arc shape with respect to either of the cross-sections parallel the X-Z plane and the cross-sections parallel to the X-Y plane, but is different in whether it is a concave shape or a convex shape between the cross-sectional directions.

Figure 11A:
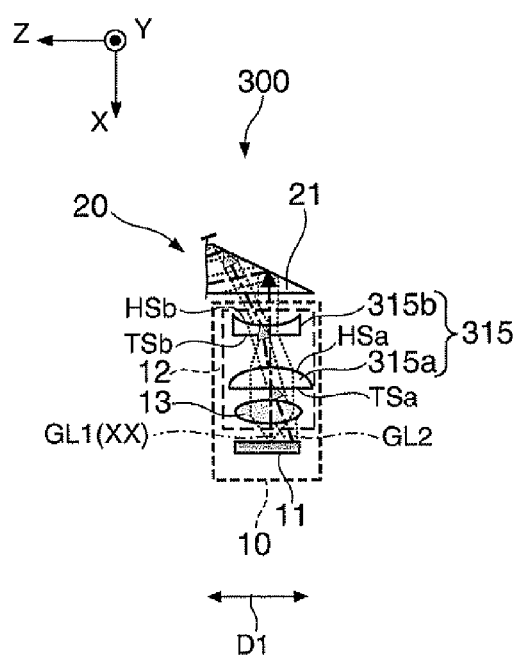
FIG. 11A is a cross-sectional view showing a virtual image display device according to a third embodiment of the invention.

Firstly, as shown in FIG. 11A, the light path of the image light with respect to the first direction D1, namely the Z direction, is changed so that the emission field angle is widened compared to the entrance field angle due to the aspect ratio conversion optical system 315 as an afocal system. In other words, it results that the virtual image by the image light is expanded in the lateral direction compared to the case in which the aspect ratio conversion optical system 315 is not present.

Figure 11B:
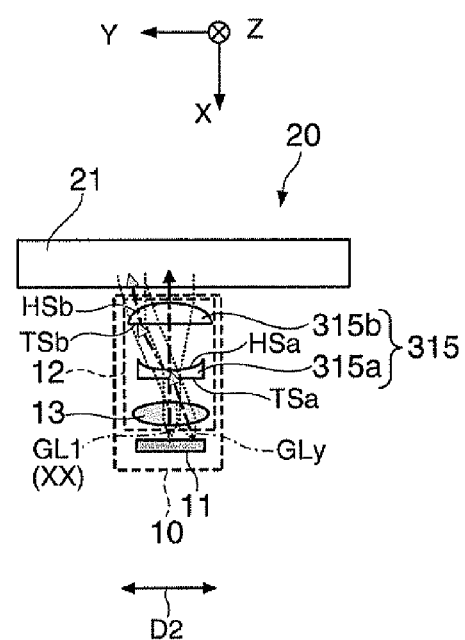
FIG. 11B is a side view thereof.

In contrast, as shown in FIG. 11B, the light path of the image light with respect to the second direction D2, namely the Y direction, is changed so that the emission field angle is narrowed compared to the entrance field angle due to the aspect ratio conversion optical system 315 as an afocal system. In other words, it results that the virtual image by the image light is contracted in the vertical direction compared to the case in which the aspect ratio conversion optical system 315 is not present.

As a result of the above, by arbitrarily adjusting the lateral expansion amount and the vertical contraction amount with respect to the aspect ratio conversion optical system 315, and then performing the conversion with the ratio different between the lateral direction and the vertical direction, the conversion of the aspect ratio, for example, from 4:3 to 16:9 can be performed. In this case, since the individual amount of variation can relatively be reduced by appropriately distributing the lateral expansion amount and the vertical contraction amount, the aspect ratio conversion optical system 315 can more easily be manufactured.

Fourth Embodiment

Hereinafter, a virtual image display device according to a fourth embodiment will be explained with reference to FIG. 12A and so on. It should be noted that the virtual image display device 400 according to the present embodiment is a modified example of the virtual image display device 100 according to the first embodiment, and it is assumed that the constituents denoted with the same reference numerals as those of the virtual display device 100 according to the first embodiment have substantially the same function unless particularly explained.

Figure 12A:
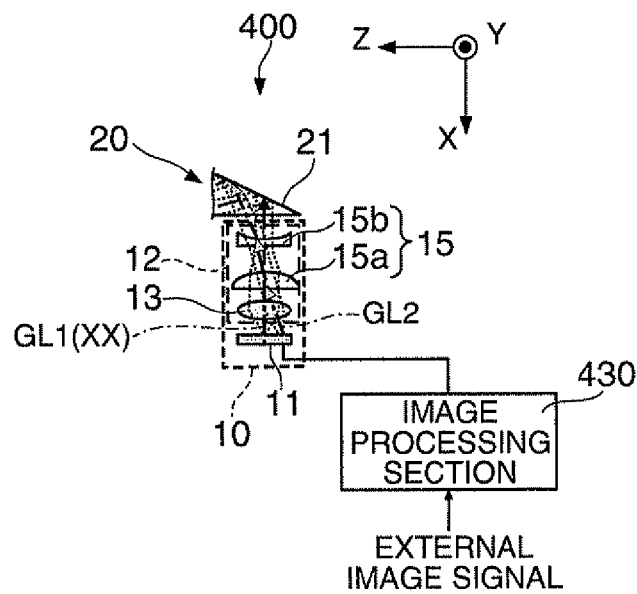
FIG. 12A is a diagram for explaining a virtual image display device according to a fourth embodiment of the invention.

As shown in FIG. 12A, the virtual image display device 400 is provided with an image processing section 430 in addition to the image forming device 10 and the light guide device 20.

Figure 12B:
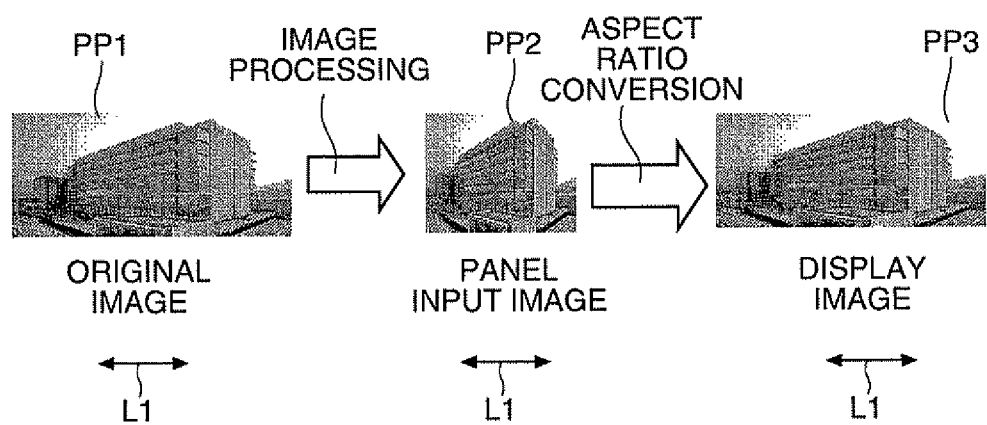
FIG. 12B is a diagram showing a procedure of image processing.

The image processing section 430 performs the image processing on the image signal externally input to the image display device 11. Specifically, the image processing section 430 performs the necessary signal processing of the image signal, and at the same time, performs the conversion process of the lateral magnification for converting the original picture PP1 corresponding to the image signal input externally into the panel input picture PP2 fitted into the shape of the image area of the image display device 11 as shown in FIG. 12B. On this occasion, the conversion process is arranged so that the display picture PP3 as the final image to be recognized by the observer is returned to the state of the original picture PP1. Specifically, it is assumed, for example, that the aspect ratio of the original picture PP1 is 16:9, the aspect ratio of the panel input picture 222, namely the aspect ratio of the image area of the image display device 11, is 4:3, and the aspect ratio of the display picture PP3 is 16:9. Further, it is assumed that in the aspect ratio conversion optical system 15, there is set the expansion conversion with the expansion amount of performing the multiplication by 4/3 with respect to the lateral direction. On this occasion, the image processing section 430 converts the original picture PP1 so as to be contracted by multiplying by 3/4 with respect to the lateral direction, namely the longitudinal direction L1, in accordance with the conversion ratio in the aspect ratio conversion optical system 15. Thus, as shown in the drawings, although the picture in the panel input picture PP2 is contracted with respect to the longitudinal direction L1, and therefore becomes relatively vertically long compared to the original picture PP1, the display picture PP3 as the final image is expanded with respect to the longitudinal direction L1 due to the aspect ratio conversion, and therefore becomes in the state in which the original picture PP1 is restored.

As described hereinabove, in the case of the present embodiment, in order for compensating the conversion ratio of the aspect ratio of the image light by the aspect ratio conversion optical system 15, the image processing section 430 performs the conversion process of the aspect ratio on the external image signal so as to have the ratio inverse to the conversion ratio in accordance with the conversion ratio of the aspect ratio using the image processing. Thus, it is possible to keep the picture PP3 to be recognized by the observer in the same state without vertically or laterally expanding or contracting the original picture PP1 based on the picture signal when inputting it externally.

Fifth Embodiment

Hereinafter, a virtual image display device according to a fifth embodiment will be explained with reference to FIG. 13A and so on. It should be noted that the virtual image display device 500 according to the present embodiment is a modified example of the virtual image display device 100 according to the first embodiment, for example, and it is assumed that the constituents denoted with the same reference numerals as those of the virtual display device 100 according to the first embodiment, for example, have substantially the same function unless particularly explained.

As shown in FIGS. 13A and 13B, the virtual image display device 500 is provided with an image processing section 530 and a drive mechanism 540 in addition to the image forming device 510 and the light guide member 21.

The image forming device 510 is provided with the collimating lens 13 and the aspect ratio conversion optical system 515, and among these constituents, the aspect ratio conversion optical system 515 is composed of a convex cylindrical lens 515a and a concave cylindrical lens 515b. Regarding the convex cylindrical lens 515a on the upstream side of the light path, the surface HSa on the downstream side of the light path is formed as a cylindrical surface, and the surface TSa on the upstream side of the light path is formed as a flat surface. In contrast, regarding the concave cylindrical lens 515b on the downstream side of the light path, the surface TSb on the upstream side of the light path is formed as a cylindrical surface, and the surface HSb on the downstream side of the light path is formed as a flat surface. Further, the surface HSa and the surface TSb form a pair of corresponding shapes, and as shown in FIG. 13B, it is arranged that if the convex cylindrical lens 515a and the concave cylindrical lens 515b are joined to each other, they adhere to each other with no substantial gap. Thus, the virtual image display device 500 is arranged to be able to be switched between the ON pattern used when the aspect ratio conversion is performed and the OFF pattern used when the aspect ratio conversion is not performed.

The drive mechanism 540 supports each of the cylindrical lenses 515a, 515b constituting the aspect ratio conversion optical system 515, and enables these lenses to move slidably in the X direction along the light axis XX. In other words, as shown in FIGS. 13A through 13F, the drive mechanism 540 makes the cylindrical lenses 515a, 515b move away from each other as much as a predetermined length or adhere to each other. Specifically, it is arranged that due to the drive mechanism 540, the cylindrical lens 515a can reciprocate between a first position PT1 shown in FIG. 13A and a second position PT2 shown in FIG. 13B, and the cylindrical lens 515b can reciprocate between a first position PS1 and a second position PS2 in conjunction with the cylindrical lens, 515a. Further, the image processing section 530 performs the image processing on the image signal externally input to the image display device 11, and on this occasion, performs setting of the image processing to be performed based on the position information of each of the cylindrical lenses 515a, 515b obtained from the drive mechanism 540. It should be noted that here the image processing performed when the separate state shown in FIG. 13A is made and the aspect ratio conversion by the aspect ratio conversion optical system 515 is performed is treated as the image processing of a normal ON pattern, and the image processing performed when the adhering state shown in FIG. 13B is made and the aspect ratio conversion by the aspect ratio conversion optical system 515 is not performed is treated as the image processing of an abnormal OFF pattern.

Hereinafter, an operation of the aspect ratio conversion in the virtual image display device 500 will be explained. Firstly, as shown in FIG. 13A, if the cylindrical lenses 515a, 515b are located at the respective first positions PT1, PS1, and are in the separate state, the cylindrical lenses 515a, 515b perform the aspect ratio conversion. Specifically, as shown in FIG. 13C, the both lenses 515a, 515b are separate from each other while exerting the refractive power with respect to the cross-sectional surface parallel to the X-Z plane, and the aspect ratio conversion optical system 515 functions as an afocal system. On this occasion, by disposing the convex lens on the upstream side of the light path, and disposing the concave lens on the downstream side of the light path, the angle is widened with respect to the image light GL2 from the peripheral side to thereby make the expansion in the lateral direction possible. In contrast, as shown in FIG. 13D, with respect to the cross-sectional surface parallel to the X-Y plane, the angle conversion is not performed on, for example, the image light GLy from the peripheral side, and the image light GLy is emitted while keeping the same state without being expanded or contracted by the aspect ratio conversion optical system 515.

Then, as shown in FIG. 13B, if the cylindrical lenses 515a, 515b are located at the respective second positions PT2, PS2, and are in the adhering state, the cylindrical lenses 515a, 515b become equivalent to an integrated single parallel plate as shown in FIGS. 13E and 13F. On this occasion, the aspect ratio conversion optical system 515 does not perform the ratio conversion with respect to either the lateral direction or the vertical direction. In other words, the aspect ratio in the image display device 11 is kept without change, and is recognized by the observer.

Figure 14A:
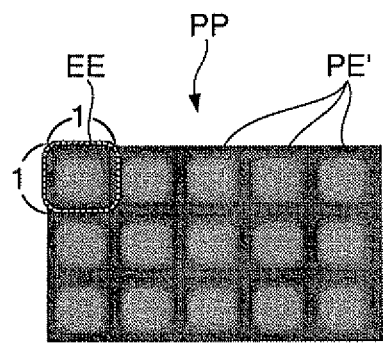
FIG. 14A is a diagram showing a state of the pixels after the conversion of the aspect ratio when the lens is in the separate state.
Figure 14B:
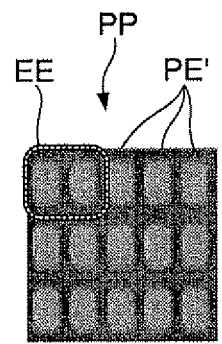
FIG. 14B is a diagram showing a state of the pixels after the conversion of the aspect ratio when the lens is in the adhering state.

As described above, by moving the cylindrical lenses 515a, 515b constituting the aspect ratio conversion optical system 515 on the light path of the image light using the drive mechanism 540 to thereby switch the positions thereof, the conversion ratio by the aspect ratio conversion optical system 515 can be switched. Thus, as shown in, for example, FIG. 14A, in the normal case in which the both cylindrical lenses 515a, 515b are separated from each other to thereby perform the aspect ratio conversion to make the final picture have the aspect ratio of 16:9, it is possible to arrange that each of the picture pixels EE is formed using a single picture pixel PE' after the conversion as a pixel of a single block to thereby make the shape of each of the picture pixels as a 1:1 square. In contrast, as shown in, for example, FIG. 14B, in the abnormal case in which the both cylindrical lenses 515a, 515b are made to adhere to each other, and the aspect ratio conversion is not performed to make the final picture keep the original aspect ratio of 4:3, it is possible to arrange that each of the picture pixels EE is formed using, for example, two picture pixels PE' as a pixel of a single block to thereby obtain a further high-resolution image. It should be noted that the image processing section 530 determines whether the image processing for the aspect ratio of 16:9 is performed or the image processing for the aspect ratio of 4:3 is performed based on the signal from the drive mechanism 540, and makes the image display device 11 perform the appropriate image formation.

Figure 15:
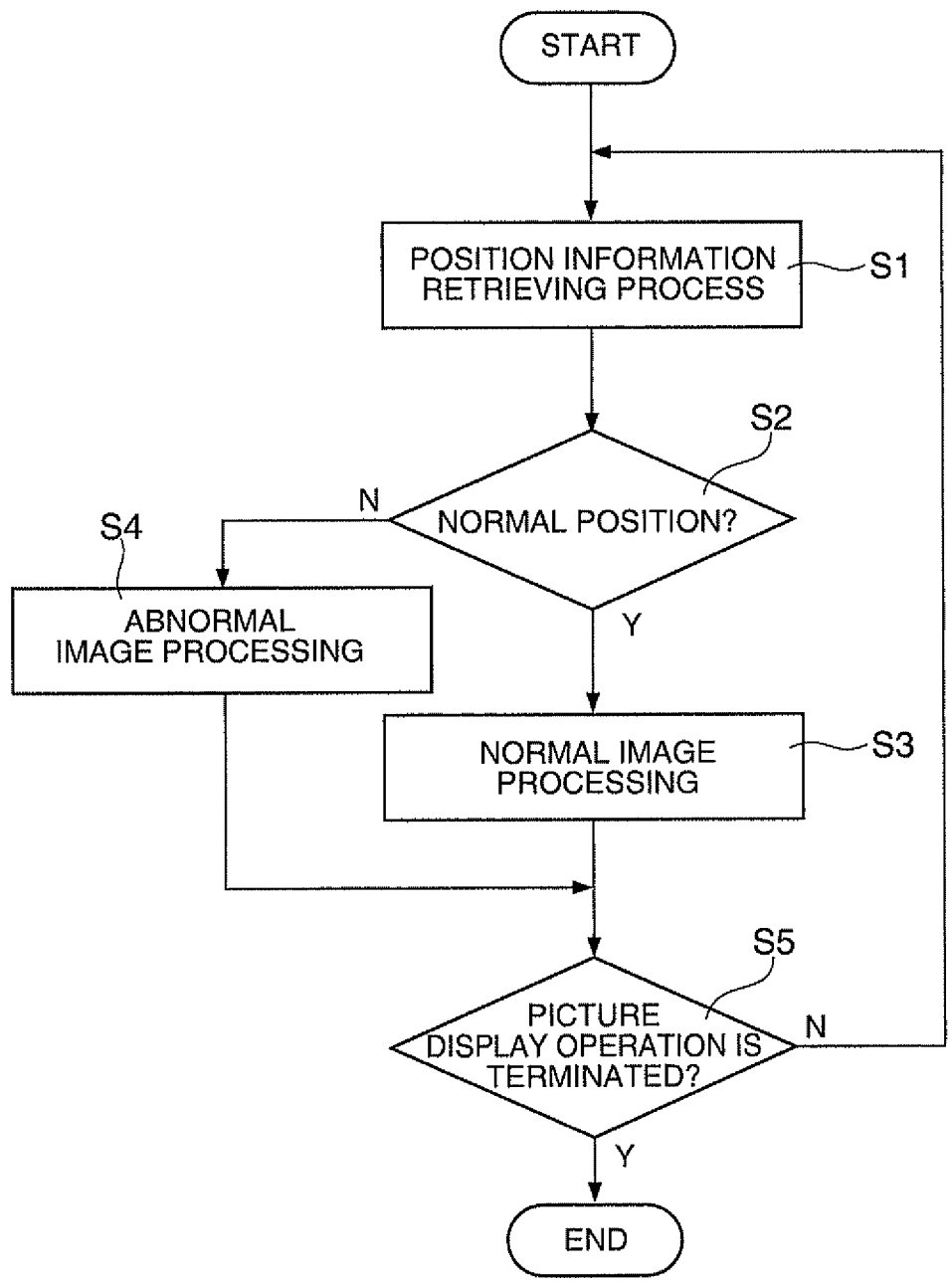
FIG. 15 is a flowchart for explaining image processing in the virtual image display device.

The image processing corresponding to the presence or absence of the aspect ratio conversion in the cases described above will be explained with reference to the flowchart of FIG. 15. Firstly, when starting up the virtual image display device 500, the image processing section 530 retrieves (step S1) the position information of each of the cylindrical lenses 515a, 515b from the drive mechanism 540. If it is determined from the information that the cylindrical lenses 515a, 515b are respectively located at the positions PT1, PS1 (Yes in step S2), the image processing section 530 performs (step S3) the image processing of the normal ON pattern in which the aspect ratio conversion by the aspect ratio conversion optical system 515 is performed. In other words, the image processing corresponding to the case of FIG. 14A, for example, is performed. In contrast, if it is determined from the position information retrieved in the step S1 that the cylindrical lenses 515a, 515b are respectively located at the positions PT2, PS2 (No in step S2), the image processing corresponding to the abnormal pattern in which the aspect ratio conversion by the aspect ratio conversion optical system 515 is not performed is performed (step S4). In other words, the image processing corresponding to the case of FIG. 14B, for example, is performed. It should be noted that the image processing section 530 continues (step S5) to perform either one of the image processing in the normal pattern in the step S3 and the image processing in the abnormal OFF pattern in the step S4 while appropriately switching between ON and OFF in accordance with the change in the position information thus retrieved in the step S1 until the picture display operation of the virtual image display device 500 is terminated.

Figure 16A:
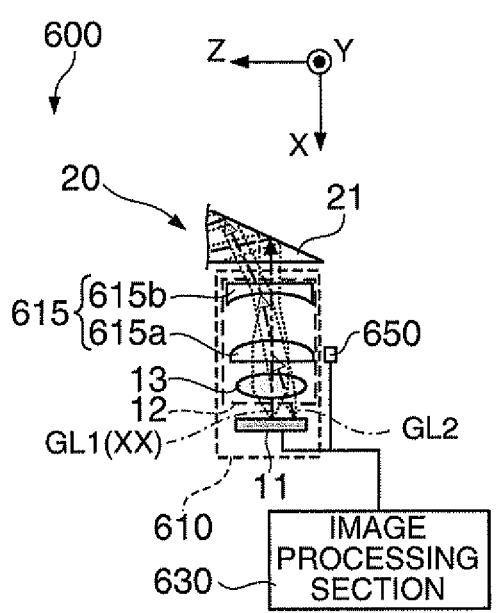
FIG. 16A is a cross-sectional view for explaining a modified example of the virtual image display device according to the fifth embodiment.
Figure 16B:
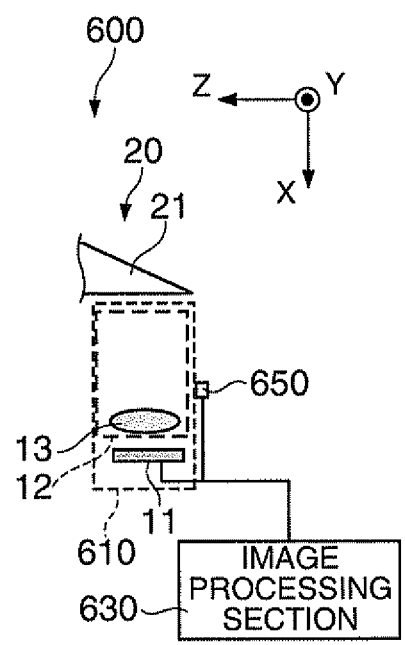
FIG. 16B is a side view thereof.

Further, it is also possible to arrange that an aspect ratio conversion optical system 615 composed of cylindrical lenses 615a, 615b is retractably disposed on the light path with a drive mechanism not shown as in a virtual image display device 600 shown in FIGS. 16A and 16B as a modified example of the present embodiment. In this case, for example, a sensor 650 provided to an image forming device 610 transmits the information on whether or not the aspect ratio conversion optical system 615 is located on the light path to an image processing section 630, and then the image processing section 630 performs the image processing in accordance with presence or absence of the aspect ratio conversion optical system 615 based on the information to thereby make it possible to perform switching between ON and OFF of the conversion ratio of the aspect ratio similarly to the case of the virtual image display device 500 shown in FIG. 10A and so on.

In the case of the present embodiment, the aspect ratio conversion optical system 515, 615 is moved by the drive mechanism 540 and so on in the virtual image display device 500, 600, switching of the conversion ratio of the aspect ratio between ON and OFF is made possible to thereby change the conversion ratio, and thus the aspect ratio can be set to a desired state.

It should be noted that although it is assumed above that the switching is possible between the two levels, namely ON and OFF, it is also possible to arrange that the aspect ratio conversion optical system 515, 615 is composed of an afocal zoom lens in the virtual image display device 500, 600 to thereby perform a continuous magnification conversion.

Sixth Embodiment

Hereinafter, a virtual image display device according to a sixth embodiment will be explained with reference to FIG. 17A and so on. It should be noted that the virtual image display device 700 according to the present embodiment is a modified example of the virtual image display device 100 according to the first embodiment, and it is assumed that the constituents denoted with the same references as those of the virtual display device 100 according to the first embodiment have substantially the same function unless specifically explained. Therefore, the part corresponding to the first display device for the right eye out of the virtual image display device 700 is illustrated alone, and the other part is omitted.

Figure 17A:
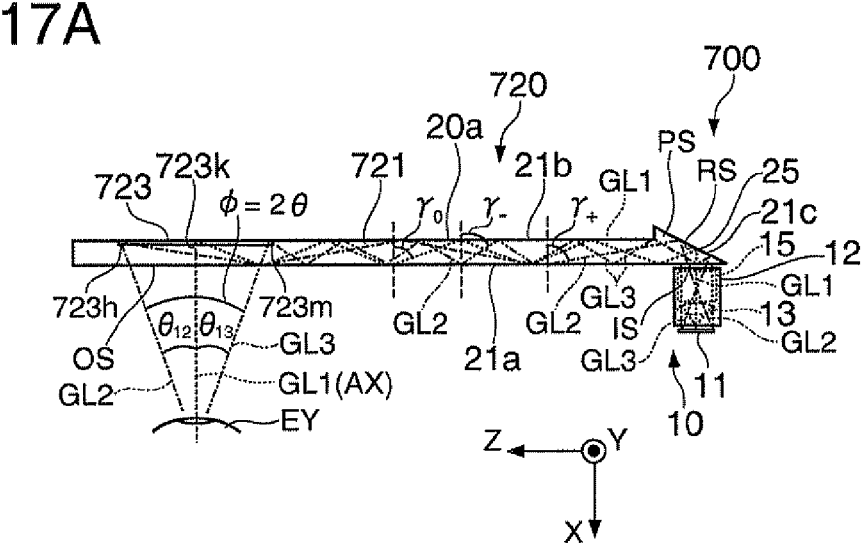
FIG. 17A is a cross-sectional view showing a virtual image display device according to a sixth embodiment of the invention.
Figure 17B:
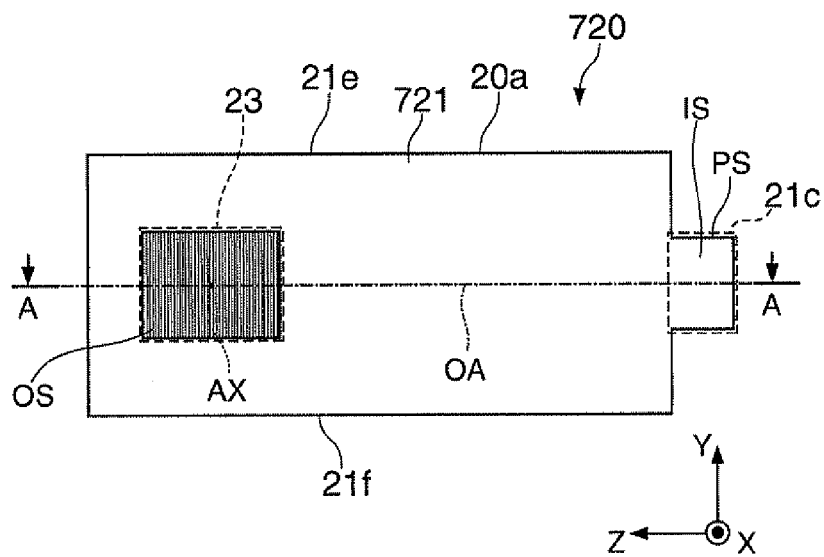
FIG. 17B is a front view of a light guide member.
Figure 17C:
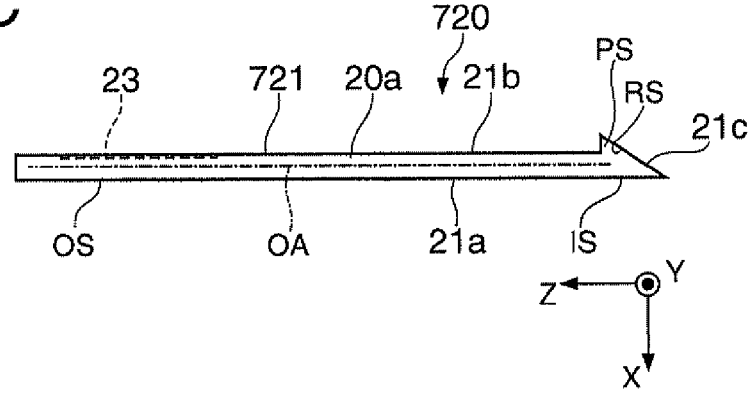
FIG. 17C is a plan view of the light guide member.

As shown in FIG. 17A, the virtual image display device 700 is provided with the image forming device 10 and a light guide device 720 as a set. The light guide device 720 has a light guide member 721. The light guide member 721 is provided with a light guide member main body section 20a, and an angle conversion section 723 as an image take-out section. It should be noted that FIG. 17A corresponds to the A-A cross-section of the light guide member 721 shown in FIG. 17B.

The overall appearance of the light guide member 721 is formed by the light guide member main body section 20a, which is a flat plate extending in parallel to the Y-Z plane in the drawings. Further, the light guide member 721 has the first reflecting surface 21a, the second reflecting surface 21b, and the third reflecting surface 21c as the side surfaces. Further, the light guide member 721 also has an upper surface 21e and a lower surface 21f opposed to each other and contiguous to the first through third reflecting surfaces 21a, 21b, and 21c. Further, the light guide plate 721 has a structure having the angle conversion section 723, which is composed of a number of minute mirrors embedded in the light guide member main body section 20a, at one end in the longitudinal direction, and a prism section PS, which is formed so as to extend the light guide member main body section 20a, and the third reflecting surface 21c attached thereto at the other end in the longitudinal direction.

The light guide member main body section 20a is made of a light transmissive resin material or the like, and has the light entrance surface IS as the light entrance section for taking in the image light from the image forming device 10 and the light exit surface OS as the light exit section for emitting the image light toward the eye EY of the observer on the obverse side plane thereof parallel to the Y-Z plane and opposed to the image forming device 10. The light guide member main body section 20a has a rectangular tilted surface RS as a side surface of the prism section PS besides the light entrance surface IS, and on the tilted surface RS, there is formed a mirror layer 25 so as to cover the tilted surface RS. Here, the mirror layer 25 cooperates with the tilted surface RS to thereby function as the third reflecting surface 21c, which is the incident light bending section tilted with respect to the light entrance surface IS. The third reflecting surface 21c bends the image light, which enters the light entrance surface IS and proceeds in the −X direction as a whole, so as to proceed in the +Z direction deflected to the +X direction as a whole to thereby surely combine the image light within the light guide member main body section 20a. Further, in the light guide member main body section 20a, there is formed the angle conversion section 723 as a minute structure along the plane on the reverse side of the light exit surface OS so as to form a thin layer. The light guide member main body section 20a guides the image light input inside via the third reflecting surface 21c to the angle conversion section 723 from the third reflecting surface 21c on the entrance side to the angle conversion section 723 on the back side.

The first and second reflecting surfaces 21a, 21b of the light guide member 721 each totally reflect the image light bent by the third reflecting surface 21c as a pair of planes, which are the principal surfaces of the light guide member main body section 20a shaped like a flat plate, opposed to each other, and extend in parallel to the Y-Z plane. The image light reflected by the third reflecting surface 21c is totally reflected by the first and second reflecting surfaces 21a, 21b repeatedly, and is guided to the back side of the light guide member 721, namely the +Z side where the angle conversion section 723 is disposed.

The angle conversion section 723 disposed so as to face the light exit surface OS of the light guide member main body section 20a is formed along an extended plane of the second reflecting surface 21b and close to the extended plane in the back side (the +Z side) of the light guide member 721. The angle conversion section 723 reflects the image light, which has been input thereto via the first and second reflecting surfaces 21a, 21b of the light guide member 721, at a predetermined angle to thereby bend it toward the light exit surface OS. In other words, the angle conversion section 723 converts the angle of the image light. It is assumed here that the image light entering the angle conversion section 723 first is the take-out object as the virtual image light. Details of the structure of the angle conversion section 723 will be described later with reference to FIG. 18A and so on.

It should be noted that it is assumed that the transparent resin material used for the light guide member main body section 20a is a high-refractive index material having a refractive index n equal to or higher than 1.5. By using the transparent resin material having a relatively high refractive index for the light guide member 721, it becomes easy for the light guide member 721 to guide the image light inside the light guide member 721, and it becomes possible to set the field angle of the image light inside the light guide member 721 to be relatively small.

The image light emitted from the image forming device 10 and then entering the light guide member 721 from the light entrance surface IS is evenly reflected and bent by the third reflecting surface 21c, then proceeds substantially along the optical axis OA in a condition of having certain spread while being totally reflected in the first and second reflecting surfaces 21a, 21b of the light guide member 721 in a repeated manner, and is then further bent in the angle conversion section 723 at an appropriate angle to thereby be in the condition in which the image light can be taken out, and is then finally emitted from the light exit surface OS. The image light emitted from the light exit surface OS enters the eye EY of the observer as the virtual image light. By the virtual image light forming an image on the retina of the observer, the observer can recognize the image light such as the picture light due to the virtual image.

The light path of the image light inside the light guide member 721 will hereinafter be explained in detail. As shown in FIG. 17A, it is assumed that the component emitted from the center portion of the image display device 11 illustrated with the dotted line in the drawing out of the image light respectively output from the image display device 11 is image light GL1, the component emitted from the right side (the −Z side) of the sheet out of the periphery of the image display device 11 illustrated with the dashed-dotted line in the drawing is image light GL2, and the component emitted from the left side (the +Z side) of the sheet out of the periphery of the image display device 11 illustrated with the dashed-two dotted line in the drawing is image light GL3.

The principal components of the respective image lights GL1, GL2, and GL3 passing through the projection optical system 12 enter the light entrance surface IS of the light guide member 721, and then repeat the total reflection on the first and second reflecting surfaces 21a, 21b at respective angles different from each other. Specifically, the image light GL1 emitted from the center portion of the image display device 11 out of the image lights GL1, GL2, and GL3 is reflected at the third reflecting surface 21c as a parallel light beam, then enters the first reflecting surface 21a of the light guide member 721 at a standard reflection angle $\gamma_0$, and is then totally reflected. Subsequently, the image light GL1 repeats the total reflection on the first and second reflecting surfaces 21a, 21b in a condition of keeping the standard reflection angle $\gamma_0$. The image light GL1 is totally reflected by the first and second reflecting surfaces 21a, 21b N times (N denotes a natural number), and then enters the center portion 723k of the angle conversion section 723. The image light GL1 is reflected at the center portion 723k at a predetermined angle, and is then emitted from the light exit surface OS in the direction of the optical axis AX perpendicular to the Y-Z plane including the light exit surface OS as a parallel light beam. The image light GL2 emitted from one end (the −Z side) of the image display device 11 is reflected by the third reflecting surface 21c as a parallel light beam, and then enters the first reflecting surface 21a of the light guide member 721 at the maximum reflection angle $\gamma_+$, and is then totally reflected. The image light GL2 is totally reflected on the first and second reflecting surfaces 21a, 21b N−M times (M denotes a natural number), then reflected in the peripheral portion 723h on the backmost side (the +Z side) of the angle conversion section 723 at a predetermined angle, and is then emitted from the light exit surface OS toward the predetermined angle direction as a parallel light beam. The emission angle on this occasion is arranged so that the light is returned toward the third reflecting surface 21c, and is an obtuse angle with the +Z axis. The image light GL3 emitted from the other end (the +Z side) of the image display device 11 is reflected by the third reflecting surface 21c as a parallel light beam, and then enters the first reflecting surface 21a of the light guide member 721 at the minimum reflection angle $\gamma_-$, and is then totally reflected. The image light GL3 is totally reflected on the first and second reflecting surfaces 21a, 21b, for example, N+M times, then reflected in the peripheral portion 723m on the side (the −Z side) closest to the entrance out of the angle conversion section 723 at a predetermined angle, and is then emitted from the light exit surface OS toward the predetermined angle direction as a parallel light beam. The emission angle on this occasion is arranged so that the light gets away from the third reflecting surface 21c, and is an acute angle with the +Z axis. It should be noted that since the light beam components constituting the image light other than the image lights GL1, GL2, and GL3 are guided and then emitted from the light exit surface OS in substantially the same manner, drawing and illustration of these components will be omitted.

Here, if n=1.5 is assumed as the value of the refractive index n of the transparent resin material used for the light guide member 721, the value of the critical angle γc is obtained as γc≈41.8°, and if n=1.6 is assumed, the value of the critical angle γc is obtained as γc≈38.7°. By setting the reflection angle γ−, which is the smallest one of the reflection angles γ0, γ+, and γ− of the respective image lights GL1, GL2, and GL3, to the value larger than the critical angle γc, it is possible to fulfill the total reflection condition inside the light guide member 721 with respect to the necessary image lights.

The structure of the angle conversion section 723 and the bend of the light path of the image light by the angle conversion section 723 will hereinafter be explained in detail with reference to FIG. 18A and so on.

Firstly, the structure of the angle conversion section 723 will be explained. The angle conversion section 723 is composed of a number of linear reflecting units 723c arranged in a stripe manner. In other words, as shown in FIGS. 18A through 18C, the angle conversion section 723 is configured by arranging a number of elongated reflecting units 723c extending in the Y direction at a predetermined pitch PT in a direction in which the light guide member 721 extends, namely the Z direction. Each of the reflecting units 723c has a first reflecting surface 723a as one reflecting surface component disposed on the back side, namely the downstream side of the light path, and a second reflecting surface 723b as another reflecting surface component disposed on the entrance side, namely the upstream side of the light path as a set of reflecting surfaces. Among these reflecting surfaces, at least the second reflecting surface 723b is a partial reflecting surface capable of transmitting a part of the light, and enables the observer to observe the external image in a see-through manner. Further, each of the reflecting units 723c has a V shape or a wedge shape in the X-Z cross-sectional view with the first and second reflecting surfaces 723a, 723b adjacent to each other. Specifically, the first and second reflecting surfaces 723a, 723b are tilted at respective angles (i.e., respective angles different from each other with the Y-Z plane) different from each other with the second reflecting surface 21b, the first reflecting surface 723a extends along a direction (the X direction) roughly perpendicular to the second reflecting surface 21b, and the second reflecting surface 723b extends in a direction forming a predetermined angle (relative angle) ζ with the corresponding first reflecting surface 723a. It is assumed here that the relative angle ζ is set to, for example, 54.7° in the specific example.

Although it is assumed in the specific example shown in FIG. 18A and so on that the first reflecting surface 723a is roughly perpendicular to the second reflecting surface 21b, the direction of the first reflecting surface 723a is arbitrarily adjusted in accordance with the specification of the light guide member 721, and can be arranged to have any tilt angle within a range from 80° to 100°, for example, clockwise with respect to the second reflecting surface 21b taking the −Z direction as a reference. Further, regarding the orientation of the second reflecting surface 723b, it is possible to arrange that the second reflecting surface 723b forms any tilt angle within a range, for example, from 30° to 40° clockwise with respect to the second reflecting surface 21b taking the −Z direction as a reference. As a result, the second reflecting surface 723b has any relative angle within a range from 40° to 70° with respect to the first reflecting surface 723a.

The bend of the light path of the image light by the angle conversion section 723 will hereinafter be explained. Here, the image light GL2 and the image light GL3 entering the both ends of the angle conversion section 723 out of the image lights will be described, while the other light paths, which are substantially the same as those of the image lights described above, will be omitted from the illustration.

Firstly, as shown in FIGS. 18A and 18B, the image light GL2 guided at the angle $\gamma_+$ with the largest total reflection angle of the image lights enters one of the reflecting units 723c disposed in the peripheral portion 723h on the +Z side the furthest from the light entrance surface IS (see FIG. 17A) of the angle conversion section 723, then reflected first by the first reflecting surface 723a on the back side, namely the +Z side, and then reflected by the second reflecting surface 723b on the entrance side, namely the −Z side. The image light GL2 passing through the reflecting unit 723c is emitted from the light exit surface OS shown in FIG. 17A and so on without passing through any other reflecting unit 723c. In other words, the image light GL2 is bent to have a desired angle with only a single passage in the angle conversion section 723, and is then taken out to the observer side.

Further, as shown in FIGS. 18A and 18C, the image light GL3 guided at the angle $\gamma_-$ with the smallest total reflection angle enters one of the reflecting units 723c disposed in the peripheral portion 723m on the −Z side the closest to the light entrance surface IS (see FIG. 17A) of the angle conversion section 723, then reflected first by the first reflecting surface 723a on the back side, namely the −Z side, and then reflected by the second reflecting surface 723b on the entrance side, namely the −Z side, similarly to the case of the image light GL2. The image light GL3 having passed through the reflecting unit 723c is also bent to have a desired angle with only a single passage in the angle conversion section 723, and is then taken out to the observer side.

Here, in the case of the two-stage reflection in the first and second reflecting surfaces 723a, 723b described above, the bending angle ψ as the angle formed between the direction in which each image light is input and the direction in which each image light is output is obtained as ψ=2(R−ζ) (R denotes the right angle) in either case as shown in FIGS. 18B and 18C. In other words, the bending angle ψ is constant irrespective of, for example, the value of the incident angle with respect to the angle conversion section 723, namely the reflection angles $\gamma_0$, and $\gamma_-$ as the total reflection angles of the respective image lights. Thus, as described above, even in the case in which the component with a relatively large total reflection angle out of the image light is made to enter the peripheral part 723h side on the +Z side out of the angle conversion section 723, and the component with a relatively small total reflection angle is made to enter the peripheral part 723m side on the −Z side out of the angle conversion section 723, it becomes possible to efficiently take out the image light in the angle condition in which the image light is collected to the eye EY of the observer as a whole. Since the configuration of taking out the image light with such an angular relationship is adopted, the light guide member 721 can make the image light pass through the angle conversion section 723 only once instead of two or more times, thus making it possible to take out the image light as the virtual image light with slight loss.

Further, by appropriately adjusting the angles and so on with which the image lights GL2, GL3 and so on are guided in the optical design of the shape and the refractive index of the light guide member 721, the shape of the reflecting unit

723c constituting the angle conversion section 723, and so on, it is possible to make the image light, which is emitted from the light exit surface OS, enter the eye EY of the observer as the virtual image light in the condition of keeping the symmetrical property as a whole taking the basic image light GL1, namely the optical axis AX, as the point of symmetry. It is assumed here that the angle θ12 of the image light GL2 on one end with respect to the X direction or the optical axis AX and the angle θ13 of the image light GL3 on the other end with respect to the X direction or the optical axis AX are roughly the same in amount and opposite to each other in direction. Since the angles θ12, θ13 correspond to the lateral field angle φ of the virtual image to be recognized by the observer, and the angle θ12 and the angle θ13 are equal to each other, the horizontal half field angle θ (i.e., φ=2θ) is obtained as θ=θ12=θ13.

Further, the specific numerical value range of the pitch PT as the interval between the reflecting units 723c constituting the angle conversion section 723 is set to 0.2 mm or larger, more preferably to 0.3 mm through 1.3 mm. By setting the pitch PT to the value within this range, it is possible to prevent the image light to be taken out from being affected by the diffraction in the angle conversion section 723, and prevent the cross stripes due to the reflecting units 723c from becoming conspicuous to the observer.

Figure 19A:
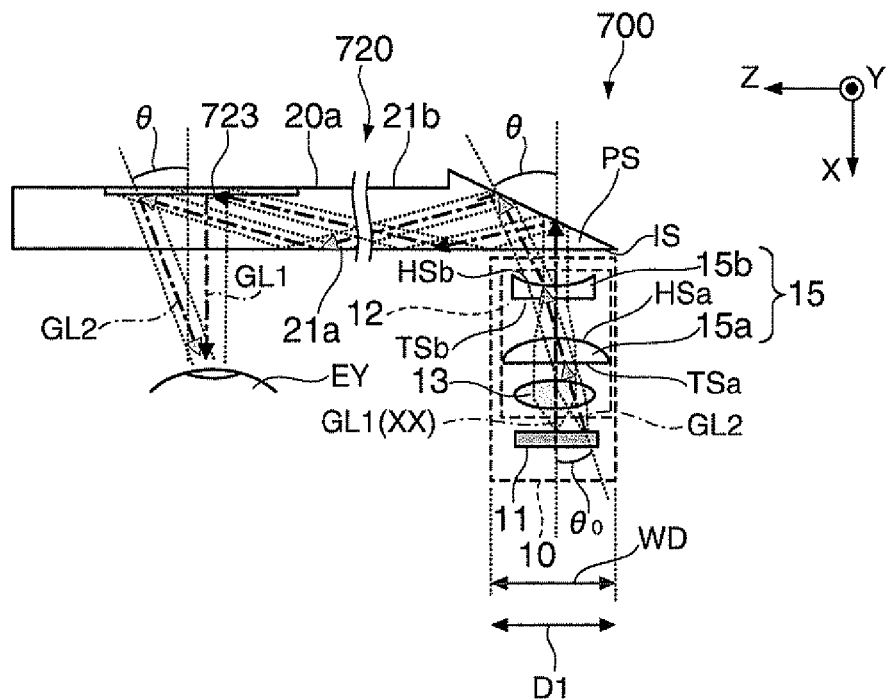
FIG. 19A is a cross-sectional view showing a structure of a virtual image display device.
Figure 19B:
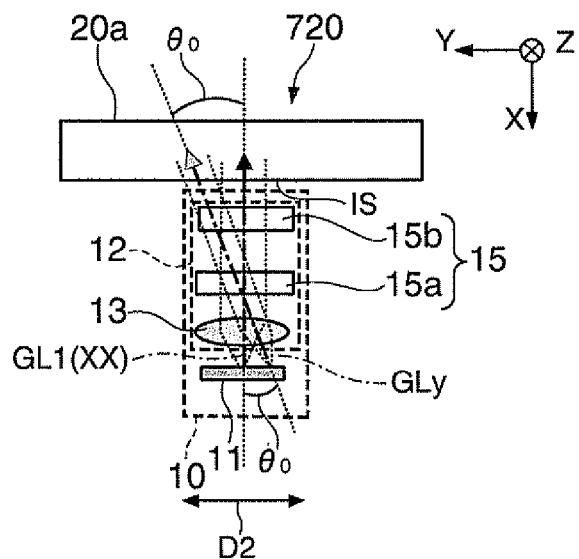
FIG. 19B is a side view thereof.

Also in the case of the present embodiment, as shown in FIGS. 19A and 19B, the virtual image display device 700 is capable of performing the adjustment to the desired state such as the aspect ratio of 16:9 due to the expansion conversion in the aspect ratio conversion optical system 15.

Figure 21A:
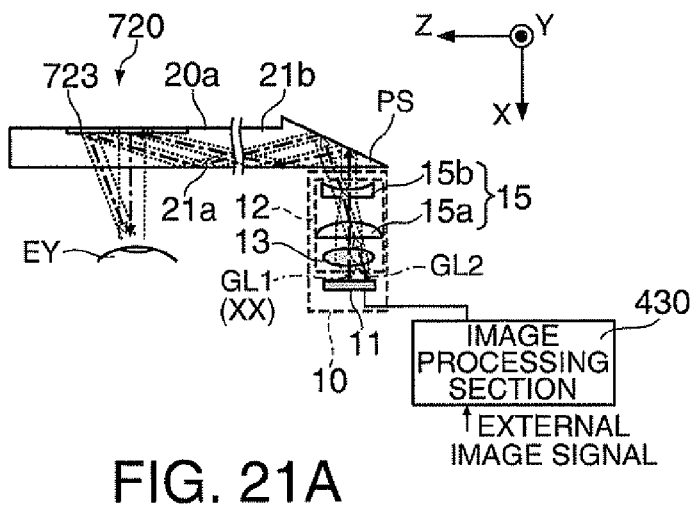
FIG. 21A is a diagram showing a modified example of the virtual image display device.
Figures 21B, 21C:
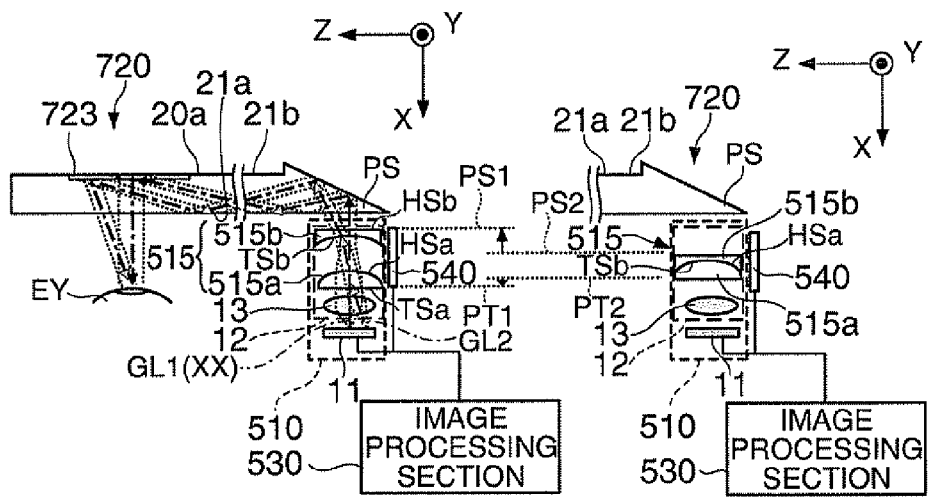
FIGS. 21B and 21C are diagrams showing another modified example of the virtual image display device.
Figures 21D, 21E:
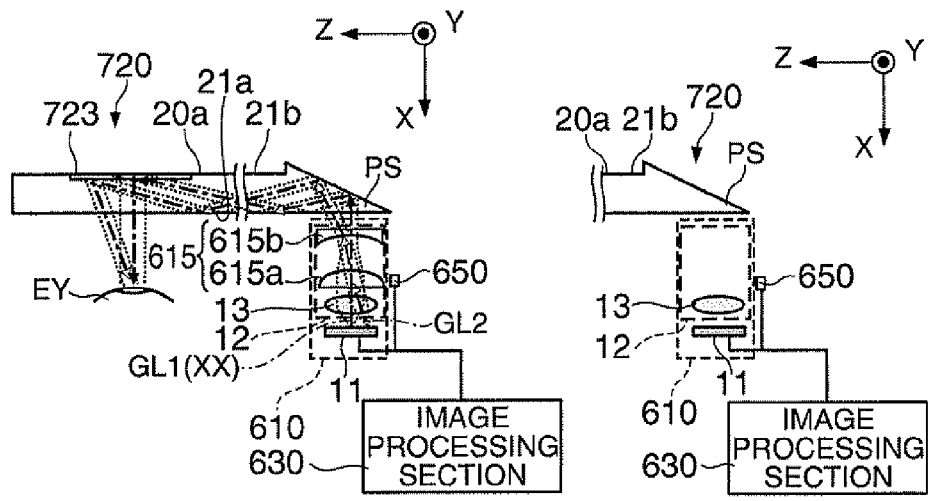
FIGS. 21D and 21E are diagrams showing still another modified example of the virtual image display device.

Further, also in the virtual image display device according to the sixth embodiment, a modified example with respect to the projection optical system can be configured similarly to those described in the second through fifth embodiments. For example, as shown in FIGS. 20A and 20B, the example of the second embodiment shown in FIG. 10A and so on can be cited as a modified example of the present embodiment. Further, as shown in FIGS. 20C and 20D, the example of the third embodiment shown in FIG. 11A and so on can be cited as a modified example of the present embodiment. Further, as shown in FIG. 21A, the example of the fourth embodiment shown in FIG. 12A can also be cited as a modified example of the present embodiment, and as shown in FIGS. 21B and 21C, and FIGS. 21D and 21E, the example of the fifth embodiment shown in FIG. 13A and FIG. 16A and so on can also be cited as modified examples of the present embodiment. Further, also in the virtual image display device according to the sixth embodiment, each of the pixels can be composed of the three or four pixel segments, the arrangement of the pixel segments can also be determined arbitrarily, and further, the color combination of the pixel segments can also be composed of three or four colors.

Other Issues

Although the invention is hereinabove explained along the embodiments, the invention is not limited to the embodiments described above, but can be put into practice in various forms within the scope or the spirit of the invention, and the following modifications, for example, are also possible.

Figure 22:
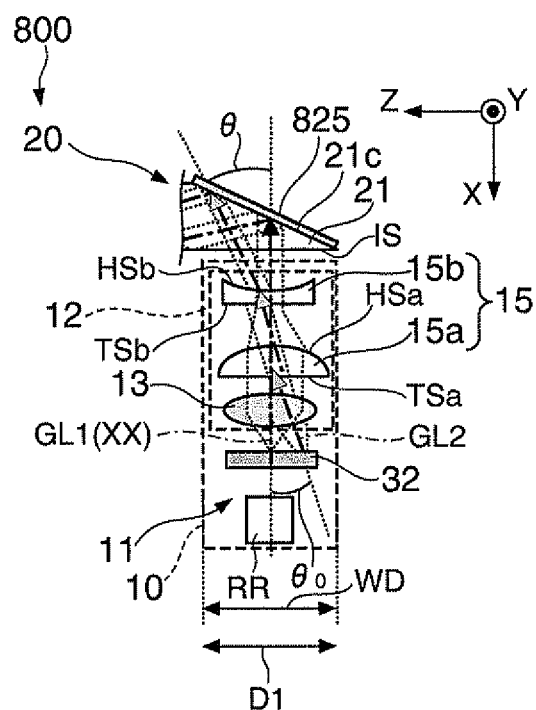
FIG. 22 is a diagram for explaining an example of another virtual image display device.

For example, it is also possible to arrange that a hologram element 825 is provided instead of the mirror layer 25 (see FIG. 2A and so on) of the virtual image display device 100 as shown in FIG. 22. In this case, the image display device 11 is arranged to have, for example, an LED light source RR for generating three colors of light beam as the light source, and the hologram element 825 is arranged to have a hologram layer having a three-layer structure corresponding to the three colors. Thus, the hologram element 825 becomes to have a function of reflecting the colored lights from the image display device 11 toward a desired direction as a virtual mirror formed in the vicinity of the third reflecting surface 21c. In other words, the hologram element 825 makes it possible to adjust the reflection direction of the image light. According to the hologram element 825, it is possible to efficiently get in the image light inside the light guide member 21. It should be noted that it is also possible to provide a hologram element to the fourth reflecting surface 21d (see FIG. 2A).

Figure 23A:
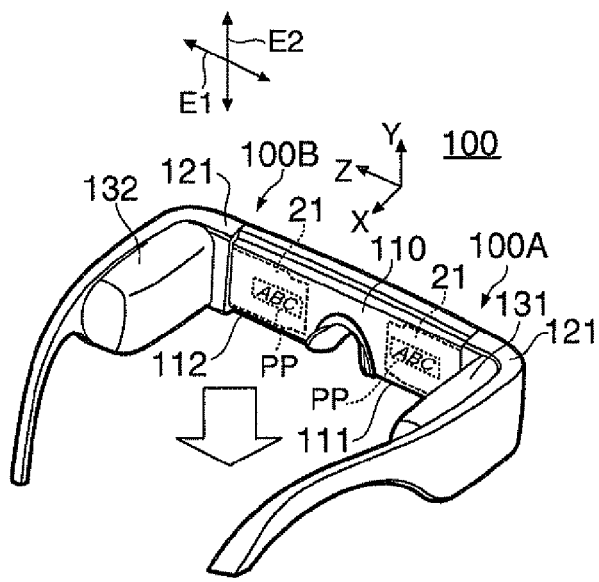
FIGS. 23A through 23D are diagrams for explaining an example of another virtual image display device.
Figure 23B:
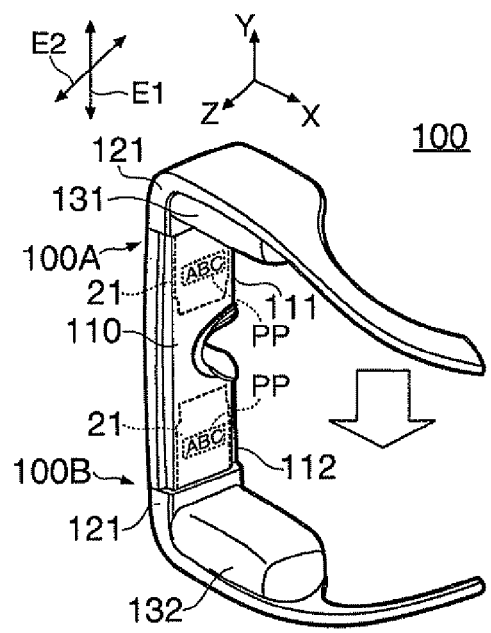
Figure 23C:
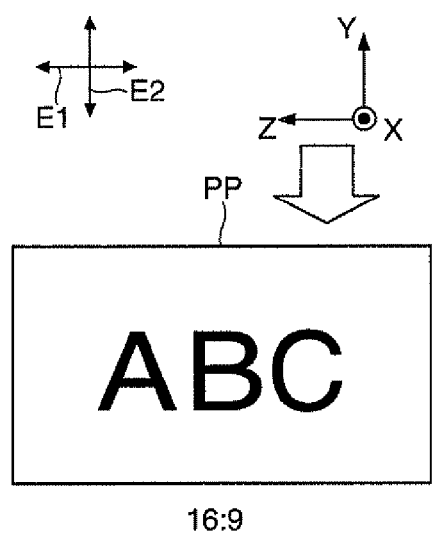
Figure 23D:
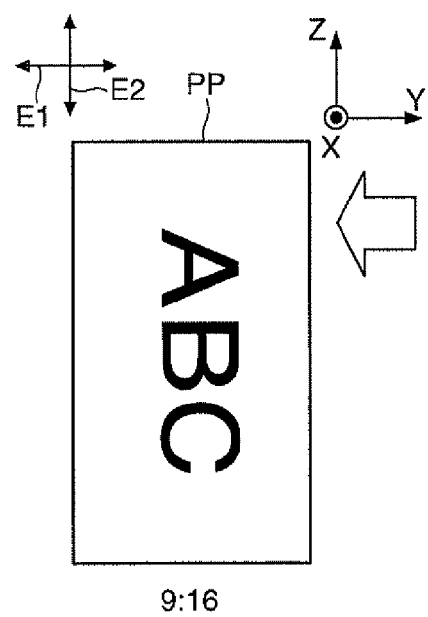

Further, as another example, as shown in FIGS. 23A through 23D, it is also possible to switch the image so as to be rotated 90° in accordance with the use condition of the virtual image display device 100. Specifically, in the case in which the virtual image display device 100 is used in a normal condition such that the observer is sitting or standing as shown in FIG. 23A, the Z direction horizontal with respect to the direction of gravitational force G1, namely the −Y direction, and the lateral direction E1 as the longitudinal direction of the virtual image display device 100 coincide with each other, and the virtual image display device 100 forms the image having the aspect ratio of 16:9 taking this direction as the longitudinal direction. In contrast, in the case in which the virtual image display device 100 is used in an abnormal condition such that the observer horizontally lies flat as shown in FIG. 23B, the Z direction horizontal with respect to the direction of gravitational force G1, namely the −Y direction, and the vertical direction E2 as the shorter-side direction of the virtual image display device 100 coincide with each other, and the virtual image display device 100 forms the image having the aspect ratio of 16:9 taking this direction as the longitudinal direction. In other words, the image forming device forms a laterally long image taking the lateral direction E1 as the longitudinal direction as shown in FIG. 23C in the state shown in FIG. 23A, or forms a vertically long image taking the vertical direction E2 as the longitudinal direction as shown in FIG. 23D in the state shown in FIG. 23B, and thus it is possible to keep the state in which the vertical or horizontal direction of the image to be viewed by the observer and the vertical or horizontal direction of the external world coincide with each other in either of the use conditions. The image formation described above can be realized by providing a gravity sensor (not shown) sensing the direction of gravitational force G1 to, for example, the virtual image display device 500 (see FIG. 13A and so on) capable of performing the conversion into a plurality of aspect ratios as described in the fifth embodiment. Specifically, it is possible to arrange that which of the directions E1, E2 should be taken as the longitudinal direction of the image is firstly determined in accordance with the direction of gravitational force G1 sensed by the gravity sensor, then the image processing is performed so that the intended image can be formed in accordance with the determination, and at the same time, the aspect ratio conversion optical system 515 is appropriately moved in a sliding manner using the drive mechanism 540 so that the conversion to the corresponding aspect ratio can be achieved.

Further, although in the embodiments described above each of the surfaces of the light guide member is formed of a plane, this is not a limitation, and it is also possible that the light guide member has a configuration of a relay system of partially having a curved surface and imaging the image light once in the inside thereof. In this case, downsizing of the whole device can be achieved by, for example, appropriately adjusting the light path.

Figure 24D:
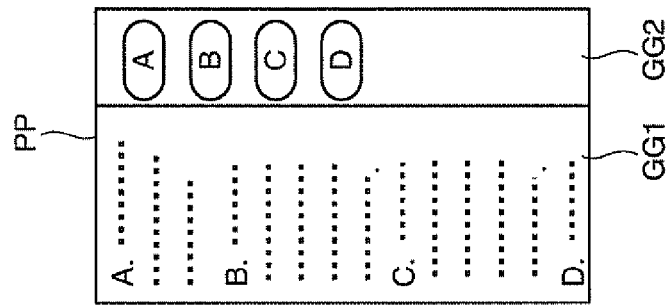
FIG. 24D is a diagram of a comparative example.
Figure 24B:
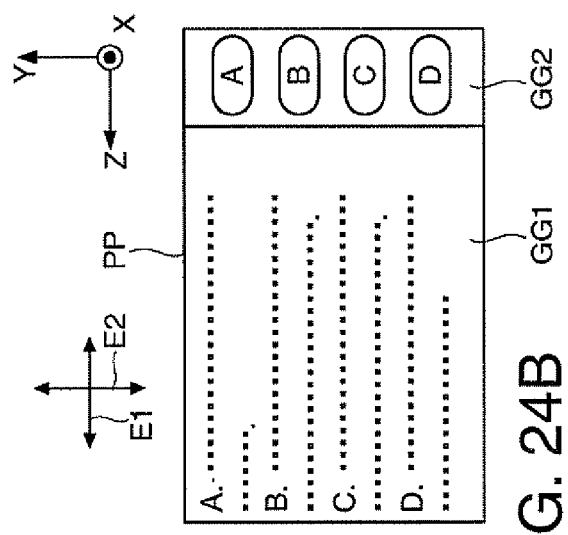
FIG. 24B is a diagram showing an example of the image after the conversion of the aspect ratio.
Figure 24C:
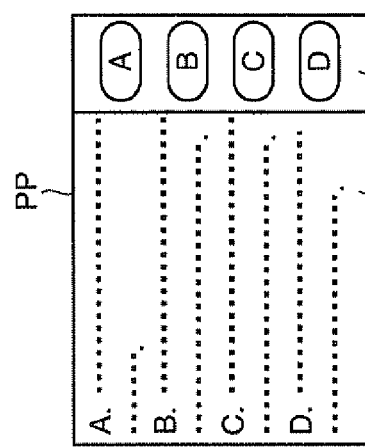
FIG. 24C is a diagram showing another example of the image after the conversion of the aspect ratio.
Figure 24A:
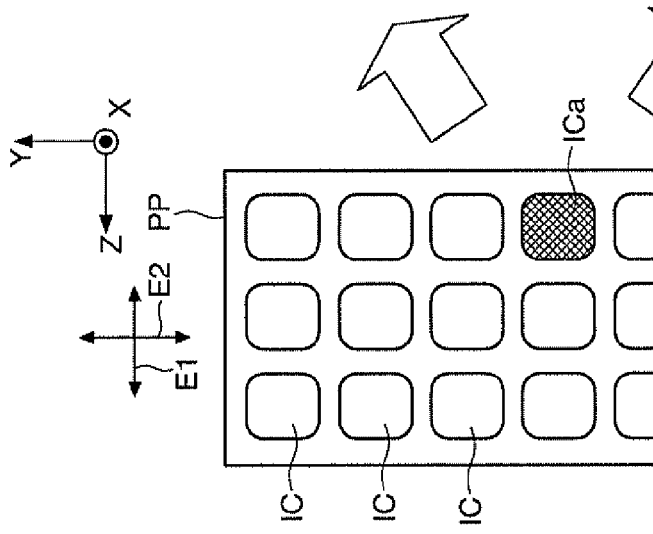
FIG. 24A is a diagram showing a display example of an image for explaining still another virtual image display device.

Further, it is possible to arrange that the conversion of the aspect ratio and so on is determined in accordance with the contents of the image to be displayed. For example, in the case of displaying an online image as shown in FIGS. 24A through 24C, it is possible to arrange that a specific website image is displayed at predetermined vertical and horizontal display magnifications with which the image can be made suitable to be viewed. Specifically, if an icon ICa for displaying the specific website image is selected from a plurality of icons IC for selecting contents arranged in a vertically long image in an initial screen shown in FIG. 24A, the vertical and horizontal display magnifications of the image are modified at the same time as the selection of the icon ICa. Thus, it is possible to arrange that regarding the images GG1, GG2 sectioned horizontally into two areas to be displayed as the website image as shown in FIGS. 24B and 24C, for example, the magnification of the aspect ratio and so on are switched automatically so that a landscape image having preferable correspondence between displayed texts A through D in the image GG1 and displayed contents A through D in the image GG2 is displayed. It should be noted that FIG. 24B shows an example of the modification in which the vertical and horizontal ratios in the case of FIG. 24A are simply exchanged, and FIG. 24C shows an example of modification in which the aspect ratio is converted at specific ratios so that the aspect ratio best suited to the display of the website image is obtained. According to the modification described above, it is possible to prevent that no modification is made in the case of FIG. 24A to keep the vertically long aspect ratio thereof, and the image having poor correspondence between the images GG1, GG2 is displayed as in, for example, a comparative example shown in FIG. 24D. Further, it is also possible to arrange that, for example, the state of the image shown in FIG. 24B is defined as a normal landscape image, and the state of the normal landscape image can be switched to the state most suited to the display of the specific website image shown in FIG. 24C. Further, in addition thereto, it is also possible to, for example, partially magnify the contents in advance in the image processing, and then perform the projection thereof.

Further, regarding the modification of the vertical and horizontal display magnifications of the image, in addition to the case of performing it automatically, it is also possible to arrange that a switch or the like is provided, and the user performs switching between ON and OFF thereof manually. Further, it is also possible to arrange that a mechanism such as a manual dial is provided to thereby move the lens. It can be realized by, for example, providing the manual dial to the drive mechanism 540 shown in FIG. 13A and so on.

Although in the embodiments described above directionality is not particularly provided to the illumination light SL from the illumination device 31, it is possible to provide the directionality corresponding to the location of the liquid crystal display device 32 to the illumination light SL. Thus, it is possible to efficiently illuminate the liquid crystal display device 32, and the luminance variation due to the location of the image light GL can be reduced.

Although in the embodiments described above the display luminance of the liquid crystal display device 32 is not particularly adjusted, it is possible to perform adjustment of the display luminance in accordance with the range and the overlap of the projection images IM1, IM2 shown in FIG. 5B.

Although in the embodiments described above the reflectance of the half mirror layer 28 provided to the fourth reflecting surface 21d is set to 20% to thereby give priority to see-through image, it is also possible to set the reflectance of the half mirror layer 28 to no lower than 50% to thereby give priority to the image light. It should be noted that if it is not necessary to make the observer observe the external image, it is possible to set the light reflectance of the fourth reflecting surface 21d to approximately 100%. Further, it is not necessary for the half mirror layer 28 to be formed on the entire area of the fourth reflecting surface 21d, but it is possible to form the half mirror layer 28 only in the necessary area thereof. It should be noted that the half mirror layer 28 can be formed on the third surface 23c of the light transmissive member 23.

Although in the embodiments described above the transmissive liquid crystal display device 32 or the like is used as the image display device 11, the image display device 11 is not limited to the transmissive liquid crystal display device 32, but various types of devices can be used therefor. For example, the configuration using the reflective liquid crystal display device is also possible, and it is also possible to use the digital micromirror device and so on instead of the liquid crystal display device 32. Further, it is also possible to use a self light-emitting element represented by, for example, an LED array and an organic EL (OLED) as the image display device 11.

Although the virtual image display device 100 according to the embodiments described above has the configuration of providing the set of the image forming device 10 and the light guide device 20 corresponding to each of the right and left eyes, it is also possible to adopt the configuration of providing the image forming device 10 and the light guide device 20 corresponding to either one of the right and left eyes to thereby view the image with a single eye.

Although in the embodiments described above, it is assumed that the first light axis AX1 passing through the light entrance surface IS and the second light axis AX2 passing through the light exit surface OS are parallel to each other, it is also possible to make these light axes AX1, AX2 non-parallel to each other.

Although in the explanation described above the specific explanation is presented assuming that the virtual image display device 100 is the head-mount display, it is also possible to modify the virtual image display device 100 into a head-up display.

Although in the explanation described above it is assumed that in the first and second reflecting surfaces 21a, 21b, the image light is totally reflected on the interface with air to thereby guide the image light without providing a mirror or a half mirror on the surfaces, the total reflection in the invention should include the reflection performed by the mirror coat or the half mirror film formed on the entire or a part of each of the first and second reflecting surfaces 21a, 21b. For example, there is included the case in which the mirror coat or the like is applied to the entire or a part of each of the first and second reflecting surfaces 21a, 21b with the incident angle of the image light fulfilling the total reflection condition, thereby reflecting the substantially whole image light. Further, it is also possible to coat the entire or a part of each of the first and second reflecting surfaces 21a, 21b with a mirror having some transmissive property providing the image light with sufficient brightness can be obtained.

Although in the explanation described above, the light guide member 21 extends in the lateral direction along which the eyes EY are arranged, it is possible to arrange that the light guide member extends in a vertical direction. In this case, it results that the optical panels 110 are disposed not serially but in parallel to each other.

The entire disclosure of Japanese Patent Application Nos. 2010-228179, filed Oct. 8, 2010 and 2011-171618, filed Aug. 5, 2011 are expressly incorporated by reference herein.

What is claimed is:

1. A virtual image display device comprising:
   an image display device adapted to form an image light;
   a projection optical system adapted to form a virtual image by the image light emitted from the image display device; and a light guide device including
a light entrance section adapted to take in the image light having passed through the projection optical system,
a light guide section adapted to guide the image light taken in from the light entrance section using total reflection on first and second total reflection surfaces extending so as to be opposed to each other, and
a light exit section adapted to take out the image light having passed through the light guide section,
wherein the projection optical system includes a toric optical system adapted to perform adjustment of an aspect ratio with respect to a virtual image in an image area of the image display device, the toric optical system having a plurality of lenses with flat surfaces facing an image display device side of the projection optical system, and curved surfaces on a light guide device side of the projection optical system.

2. The virtual image display device according to claim 1, wherein
the toric optical system performs conversion of an aspect ratio with respect to the virtual image so as to increase a lateral ratio for an observer taking an aspect ratio of display in the image display device as a reference.

3. The virtual image display device according to claim 2, wherein
the toric optical system performs either one of
an expansion conversion with respect to a first direction corresponding to the lateral direction for the observer, and
a contraction conversion with respect to a second direction perpendicular to the first direction.

4. The virtual image display device according to claim 1, wherein
the image forming device is disposed on an ear side of an observer observing the image light, and
the light guide device guides the image light along a lateral direction for the observer.

5. The virtual image display device according to claim 1, wherein
in the image display device, an aspect ratio of a shape of each of a plurality of pixels disposed in the image area is inverse to a ratio of the conversion by the toric optical system.

6. The virtual image display device according to claim 5, wherein
in the image display device, each the pixels is composed of three pixel segments arranged in a line.

7. The virtual image display device according to claim 6, wherein
the three pixel segments respectively have three colors of RGB, and are arranged in a line along the lateral direction for the observer.

8. The virtual image display device according to claim 5, wherein
in the image display device, each the pixels is composed of four pixel segments arranged in a 2×2 matrix.

9. The virtual image display device according to claim 8, wherein
the four pixel segments are assigned with three colors of RGB.

10. The virtual image display device according to claim 8, wherein
the four pixel segments are assigned with four colors obtained by adding another color to the three colors of RGB.

11. The virtual image display device according to claim 1, further comprising:
an image processing section adapted to perform a conversion process of an aspect ratio, which is inverse to a conversion ratio of an aspect ratio of the image light by the toric optical system, with respect to an image signal input to the image display device in accordance with the conversion ratio of the aspect ratio of the image light by the toric optical system.

12. The virtual image display device according to claim 1, further comprising:
a drive mechanism adapted to move the toric optical system on a light path of the image light.

13. The virtual image display device according to claim 1, wherein
the toric optical system includes a pair of cylindrical lenses respectively having concave and convex shapes and disposed in a direction opposed to a light entrance surface of the light guide device adapted to take in the image light, and a conversion ratio of an aspect ratio of the image light is adjusted by changing locations of the cylindrical lenses.

14. The virtual image display device according to claim 1, wherein
the light guide section includes a first reflecting surface and a second reflecting surface disposed in parallel to each other, and adapted to make light guide by total reflection possible,
the light entrance section includes a third reflecting surface forming a predetermined angle with the first reflecting surface, and
the light exit section includes a fourth reflecting surface forming a predetermined angle with the first reflecting surface.

15. The virtual image display device according to claim 14, wherein
the light guide device has a hologram element in at least one of the third reflecting surface and the fourth reflecting surface.

16. The virtual image display device according to claim 1, wherein
the light guide device further includes an angle conversion section having a plurality of reflecting surfaces extending in a predetermined direction, and bending the image light guided by total reflection on the first and second total reflection surfaces of the light guide section toward the light exit section using the plurality of reflecting surfaces.

17. The virtual image display device according to claim 1,
wherein the image display device is adapted to form image light comprised of a plurality of light rays propagating in different directions, and
wherein the projection optical system includes a collimating lens disposed between the toric optical system and the image display device that parallelizes different ones of the plurality of light rays into differently parallel light ray groups.

* * * * *